US 6,266,308 B1

(12) United States Patent
Andoh

(10) Patent No.: US 6,266,308 B1
(45) Date of Patent: Jul. 24, 2001

(54) OPTICAL DISC DRIVE AND METHOD OF DETECTING AN END PORTION OF RECORDED DATA RECORDED IN AN OPTICAL DISC LOADED IN THE OPTICAL DISC DRIVE

(75) Inventor: Junichi Andoh, Tokyo (JP)

(73) Assignee: Mitsumi Electric Co., Tokyo (JP)

( * ) Notice: Subject to any disclaimer, the term of this patent is extended or adjusted under 35 U.S.C. 154(b) by 0 days.

(21) Appl. No.: 09/320,312

(22) Filed: May 26, 1999

(51) Int. Cl.$^7$ ........................................... G11B 3/90
(52) U.S. Cl. ........................... 369/53.24; 369/32
(58) Field of Search .................... 369/32, 33, 44.27, 369/44.28, 47.49, 47.54, 47.55, 53.24, 53.2, 53.22, 53.23, 53.29, 53.37, 53.39, 53.41, 53.45, 124.02, 124.08

(56) References Cited

U.S. PATENT DOCUMENTS

| | | |
|---|---|---|
| 5,081,616 | 1/1992 | Kitihara et al. . |
| 5,559,778 | 9/1996 | Inokuchi et al. . |
| 5,706,261 | 1/1998 | Udagawa . |

FOREIGN PATENT DOCUMENTS

0552986A2   7/1993  (EP) .

*Primary Examiner*—Paul W. Huber
(74) *Attorney, Agent, or Firm*—Patents +TMS

(57) ABSTRACT

An optical disc drive has a function that detects an end portion of recorded data recorded in an optical disc loaded in the optical disc drive. The function is achieved by the method comprising the steps of setting a detection starting position and a detection ending position on the optical disc; dividing the number of tracks between the detection starting position and the detection ending position into more than three divided portions defined by dividing points; detecting presence or absence of the recorded data at the dividing points sequentially from the detection starting point; and determining that the end portion of the recorded data lies in a divided portion specified between the dividing point at which presence of the data is detected and the adjacent other dividing point at which absence of the data is detected. These steps are carried out for the specified divided portion until the interval of the specified divided portion or a subsequently obtained divided portion becomes less than a predetermined value, thereby enabling to specify the position of the end portion of the recorded data.

12 Claims, 21 Drawing Sheets

FIG. 8

FRAME FORMAT OF 1 ATIP FRAME (42Bits 1/75sec)

| NUMBER OF BITS | 4 | 8 | 8 | 8 | 8 | 14 |
|---|---|---|---|---|---|---|
| BIT POSITION | 1234 | 111<br>56789012 | 1111112<br>34567890 | 22222222<br>12345678 | 2333333333333444<br>9012345678901234567... |
| DATA | Sync | Min | Sec | Frame | Error Detection Code |

FIG. 14

Q DATA 96Bits FORMAT

| Q1~Q4 | Q5~Q8 | Q9..........Q80 | Q81.........Q96 |
|---|---|---|---|
| CONTROL | ADDRESS | DATA 72Bits | CRC 16Bits |

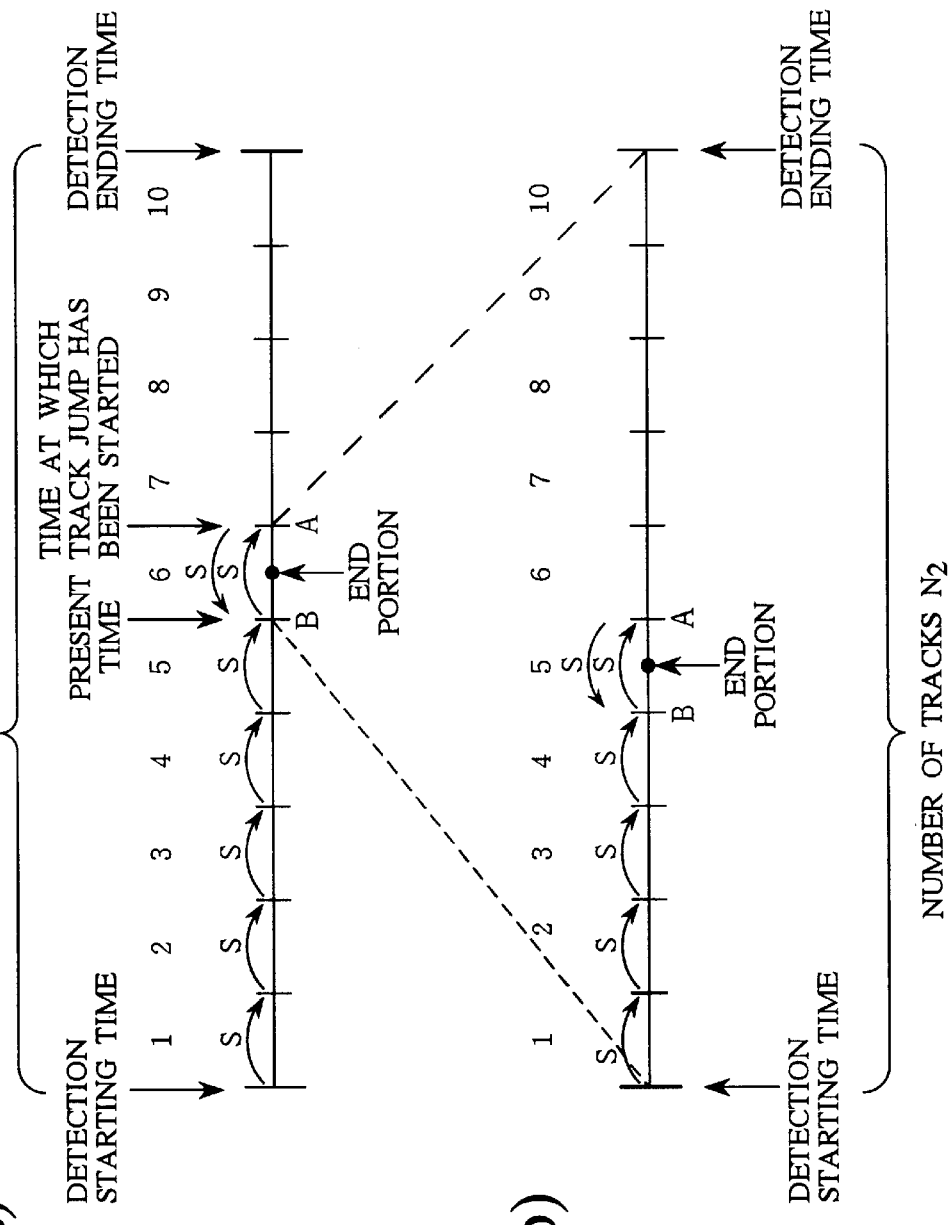

ROUTINE FOR DETECTING END PORTION OF RECORDED DATA

ROUTINE FOR DETECTING END PORTION OF RECORDED DATA WITH ONE EFM FRAME AS UNIT

OPTICAL DISC DRIVE AND METHOD OF DETECTING AN END PORTION OF RECORDED DATA RECORDED IN AN OPTICAL DISC LOADED IN THE OPTICAL DISC DRIVE

BACKGROUND OF THE INVENTION

1. Field of the Invention

This invention relates to an optical disc drive for recording and playing back an optical disc and a method of detecting an end portion of recorded data recorded in an optical disc loaded in the optical disc drive.

2. Description of the Prior Art

There are known optical disc drives for recording and playing back (reproducing) a recordable type optical disc such as a CD-R (CD-Recordable)or CD-RW (CD-Rewritable) or the like.

In such an optical disc drive, there is a case that recording operation is stopped or interrupted during carrying out the operation, because servo control such as a tracking servo control comes to an disengaging or disenabling state due to vibration or the like. In such a case, in order to specify the end portion of the recorded data (a part of data which has been recorded), detection operation is carried out for seeking out the end portion for the recorded data.

However, in the conventional optical disc drives, they perform many unnecessary processes for detecting the end portion of the recorded data, so that it takes a relatively long time for detecting the end portion of the recorded data.

SUMMARY OF THE INVENTION

In view of the problem in the prior art described above, the object of the present invention is to provide an optical disc and a method of detecting an end portion of recorded data recorded in an optical disc loaded in the optical disc drive which can detect an end portion of recorded data recorded in an optical disc in a short time.

In order to achieve the object, the present invention is directed to an optical disc drive for recording and playing back an optical disc having a plurality of tracks. The disc drive comprises an optical disc driving mechanism for rotating an optical disc; an optical pick-up for recording and playing back data to and from the optical disc; signal processing means at least for processing signals read out from the optical disc through the optical pick-up; and control means for controlling at least the optical disc driving mechanism, the optical pick-up and the signal processing means, and means for detecting an end portion of recorded data in the optical disc. In detecting the end portion, a detection starting position and a detection ending position are set in the optical disc and the number of tracks between the detection starting position and the detection ending position is divided into more than three divided portions defined by dividing points. Then, the detecting means detects presence or absence of the recorded data in each of the dividing points by moving the optical pick-up from the detecting starting point and then determines that the end portion of the recorded data lies in a divided portion specified between the dividing point at which presence of the data is detected and the adjacent other dividing point at which absence of the data is detected.

According to the optical disc drive as described above, it is possible to detect the end portion of the recorded data recorded in the optical disc in a short time.

In the present invention, it is preferred that the optical pick-up is moved in a stepwise manner without acquiring time information from the optical disc. Specifically, the optical pick-up is moved from one dividing point to adjacent dividing point by means of a track jump operation without acquiring time information from the optical disc on or before the absence of the data is detected.

According to the optical disc drive as described above, it does not need a time for acquiring the time information such as ATIP information which is previously recorded in the optical disc when the optical pick-up is moved on each of the dividing points and a time for processing the time information. This also makes it possible to shorten the time required for the detection of the end portion of the recorded data.

In the present invention, it is preferred that the detecting means is constructed to repeatedly continue the detection of the presence or absence of the recorded data for thus obtained specified divided portion until the interval of a subsequently obtained divided portion becomes less than a predetermined value, in which the dividing point at which the presence of the data is detected is set to be one of a detection starting position and a detection ending position and the adjacent other dividing point is set to be the other position, and in the subsequent process vice versa.

Further, it is also preferred that the detecting means is constructed to detect the presence and absence of the data continuously in the specified divided portion after the interval of the specified divided portion has become smaller than the predetermined value, thereby specifying the end portion of the recorded data.

Furthermore, in the present invention, the optical disc drive can further comprise means for counting the number of tracks on which the optical pick-up has passed, in which the detecting means is constructed to move the optical pick-up to the target track while grasping the position of the optical pick-up relative to the optical disc based on the counted value of the counting means.

Moreover, in the present invention, it is preferred that the number of the divided portions is 8 to 10.

Another aspect of the present invention is directed to a method of detecting an end portion of recorded data recorded in an optical disc loaded in an optical disc drive. The method comprises the steps of: (a) setting a detection starting position and a detection ending position on the optical disc; (b) dividing the number of tracks between the detection starting position and the detection ending position into more than three divided portions defined by dividing points; (c) detecting presence or absence of the recorded data at each of the dividing points sequentially from the detection starting point; and (d) determining that the end portion of the recorded data lies in a divided portion specified between the dividing point at which presence of the data is detected and the adjacent other dividing point at which absence of the data is detected.

According to this method, it is also possible to detect the end portion of the recorded data recorded in the optical disc in a short time.

In this method, it is preferred that the optical disc drive is equipped with an optical pick-up for recording and playing back data, in which the detection of the presence or absence of the recorded data is carried out by moving the optical pick-up in a stepwise manner without acquiring time information recorded in the optical disc.

Further, it is also preferred that the steps (a) to (d) are repeatedly carried out for the specified divided portion and then a subsequently obtained divided portion until the interval of the divided portion becomes less than a predetermined value.

Furthermore, it is preferred that the method further comprises the step of detecting the presence and absence of the data continuously in the specified divided portion after the interval of the specified divided portion has become smaller than the predetermined value, thereby specifying the end portion of the recorded data.

In this method, it is preferred that the number of the divided portions is 8 to 10.

Other objects, structures and advantages of the present invention will be apparent when the following description of the preferred embodiment is considered taken in conjunction with the accompanying drawings.

BRIEF DESCRIPTION OF THE DRAWINGS

FIG. 8 is a chart which shows a format of an ATIP frame.

FIG. 14 is a drawing which shows a format of the Q data of 96 bits.

FIGS. 17(a) and 17(b) are a chart for explaining the method of detecting the end portion of the recorded data recorded in an optical disc loaded in the optical disc drive of the present invention.

DETAILED DESCRIPTION OF THE PREFERRED EMBODIMENTS

With reference to the appended drawings, a detailed description of preferred embodiments of an optical disc drive according to the present invention and a method of detecting an end portion of recorded data recorded in an optical disc loaded in the optical disc drive will be made below.

Figure 1:
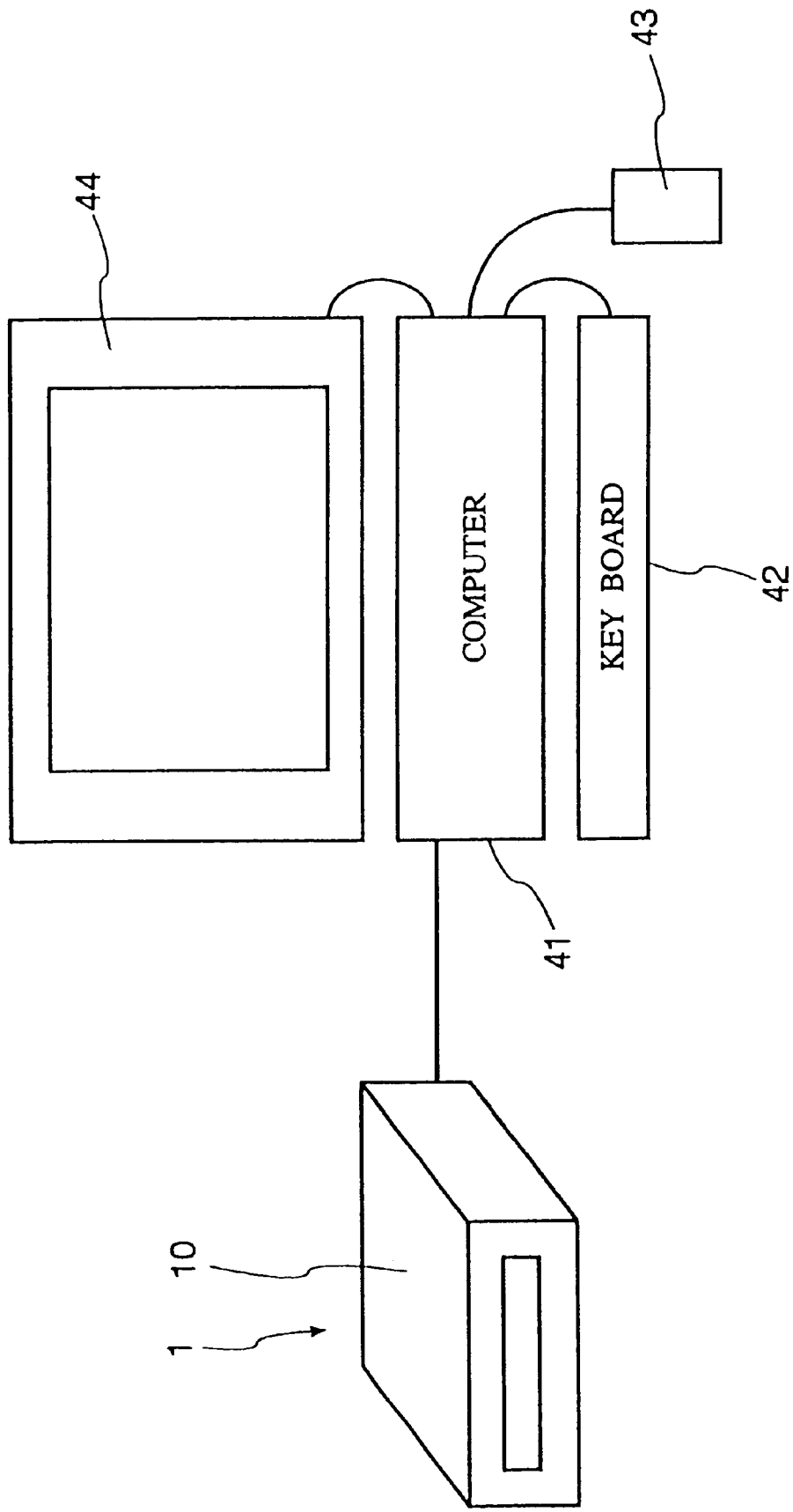
FIG. 1 is an illustration which shows a state that the optical disc drive according to the present invention is connected to an computer.
Figure 2:
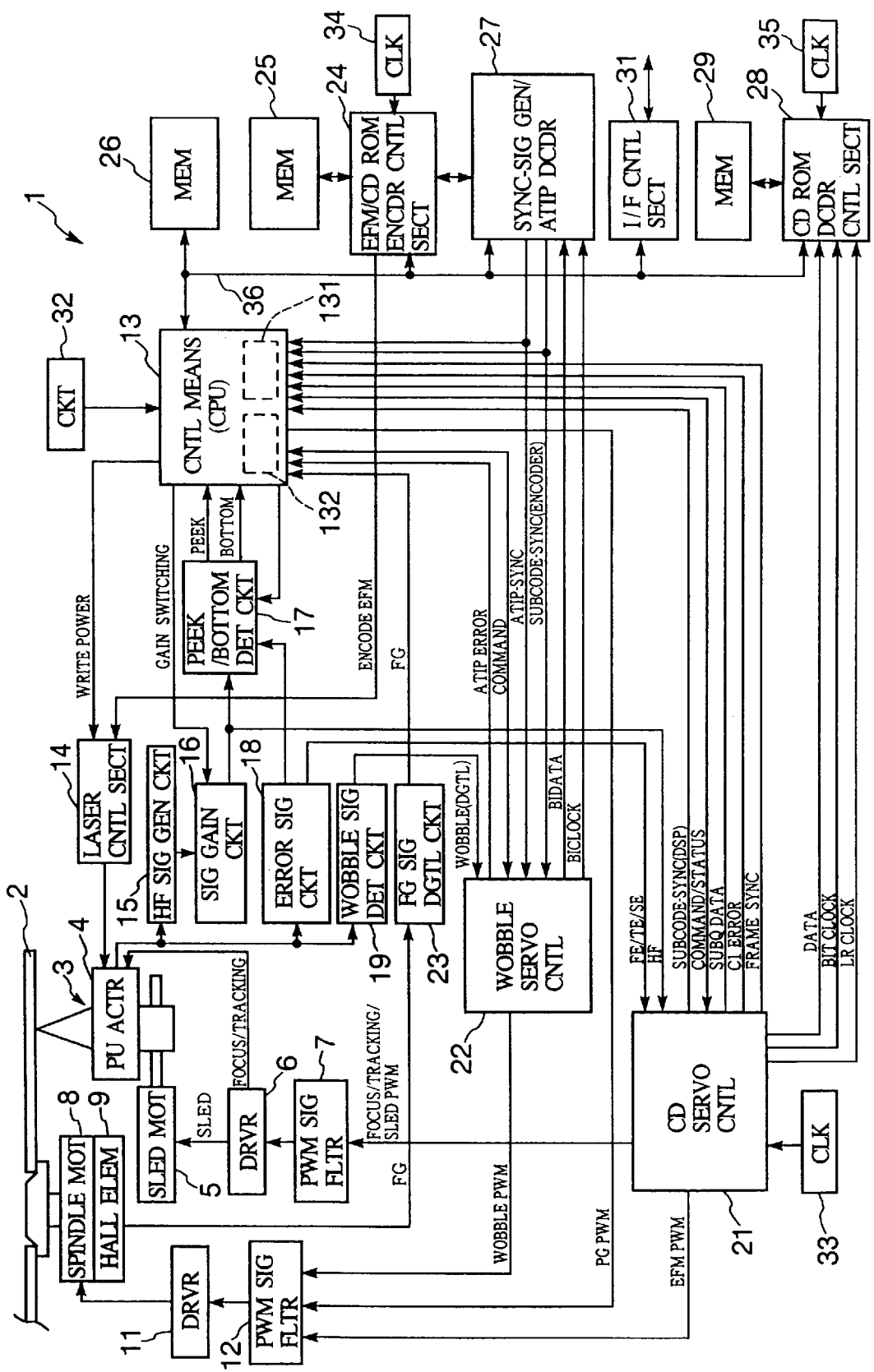
FIG. 2 is a block diagram which shows an embodiment of the optical disc drive according to the present invention.

FIG. 1 is an illustration which shows an optical disc drive 1 of the present invention in a connected state with a computer, and FIG. 2 is a block diagram which shows an embodiment of the optical disc drive 1 of the present invention.

The optical disc drive 1 shown in these drawings is a CD-R drive for recording and playing back an optical disc (CD-R/CD-Recordable) 2.

In optical discs 2 of the type of CD-R, there is formed a spiral pre-groove (WOBBLE) which is not shown in the drawing.

The pre-groove meanders at a predetermined period (22.05 kHz at the reference rotation speed (1×)), and ATIP (Absolute Time in Pre-groove) information (time information) is previously recorded with the pre-groove. The ATIP information is recorded by being biphase modulated and frequency-modulated at a carrier frequency of 22.05 kHz.

The Pre-groove functions as a guide groove when forming pits and lands (recording pits and lands) for the optical disc 2. Further, the information recorded with the pre-groove is reproduced and then utilized to control the rotation speed of the optical disc 2 and specify a recording position (absolute time) on the optical disc 2.

The optical disc drive 1 is equipped with a turntable and a spindle motor 8 for rotating the turntable (that is, for rotating the optical disc), and includes a rotation driving mechanism (not shown in the drawings) for rotating the turntable when the optical disc is loaded thereon. The rotation driving mechanism is constructed so as to be able to rotate the optical disc 2 in multiple levels of the rotational speed.

Further, in the vicinity of the spindle motor 8, there is provided a Hall element 9 for detecting the rotation of the spindle motor 8. The Hall element 9 outputs FG signals (in the form of sine wave), and the cycle of the FG signal corresponds to the rotation number of the spindle motor 8.

Further, the optical disc drive 1 includes an optical head (hereinafter, referred to as "optical pick-up") 3 capable of movement along a radial direction of the loaded optical disc 2 (i.e., along a radial direction of the turntable); an optical pick-up moving mechanism (not shown in the drawings) equipped with a sled motor 5 to move the optical pick-up 3, that is an optical pick-up base of the optical pick-up 3 along the radial direction of the turntable; drivers 6 and 11; PWM signal smoothing filters 7 and 12; control means 13; a laser control section 14; a HF signal generating circuit 15; a HF signal gain switching circuit 16; a peak/bottom detection circuit 17; an error signal generating circuit 18; a WOBBLE signal detection circuit 19; a CD servo controller 21; a WOBBLE servo controller 22; a FG signal digitization circuit 23; an EFM/CD-ROM encoder control section 24; memories 25, 26 and 29; a SYNC signal generating/ATIP decoder 27; a CD-ROM decoder control section 28; an interface control section 31; clocks 32, 33, 34 and 35; and a casing 10 which houses all these elements. Hereinbelow, the radial direction of the optical disc 2 along which the optical pick-up 3 is capable of moving will simply be referred to as the "radial direction."

The optical pick-up 3 includes (but not shown in the drawings) an optical pick-up base equipped with a laser diode (light source) and a photodiode (light-receiving element), and an objective lens (converging lens). The operation of the laser diode is controlled by the laser control section 14.

The objective lens is supported by suspension springs provided on the pick-up base and can be moved, with respect to the pick-up base, along the radial direction and the rotational axial direction of the optical disc 2 (i.e., the axial direction of the turntable). By constructing the objective lens in this way, if the objective lens is shifted from its neutral position (central position), the restoring force of the suspension springs will bias the objective lens toward the neutral position. Hereinbelow, the rotational axial direction of the optical disc 2 will be referred to simply as "axial direction."

Further, the optical pick-up 3 includes an actuator 4 to move the objective lens in the radial direction as well as the axial direction with respect to the pick-up base, respectively.

The control means 13 is generally constructed from a microcomputer (CPU), and it carries out control of the entire of the optical disc drive 1, including control of the optical pick-up 3 (actuator 4), sled motor 5, spindle motor 8, laser control section14, HF signal gain switching circuit 16, peak/bottom detection circuit 17, CD servo controller 21, WOBBLE servo controller 22, EFM/CD-ROM encoder control section 24, memories 25, 26 and 29, SYNC signal generating/ATIP decoder 27, CD-ROM decoder control section 28, interface control section 31 and the like. Further, the control means 13 also act to perform a main function of an end portion detecting means for detecting an end portion of recorded data (EFM data) recorded in an optical disc 2.

Further, from the control means 13, addresses, data, commands and the like are inputted via an address/data bus 36 to the EFM/CD-ROM encoder control section 24, memory 26, SYNC signal generating/ATIP decoder 27, CD-ROM decoder control section 28, interface control section 31 and the like.

An separate apparatus (in the present embodiment, a computer 41) can be freely connected to (and disconnected from) the optical disc drive 1 via the interface control section 31, and this makes it possible for the optical disc drive 1 and the computer 41 to communicate with each other.

As for the interface control section 31, it is possible, for example, to use an ATAPI (IDE interface) or SCSI or the like.

A keyboard 42, a mouse 43 and a monitor 44 are connected to the computer 41.

In this regard, it is to be noted that the interface control section 31 constitutes a transmission means, and that the HF signal generating circuit 15, the HF signal gain switching circuit 16, the peak/bottom detection circuit 17, the error signal generating circuit 18, the WOBBLE signal detection circuit 19, the CD servo controller 21 and the WOBBLE servo controller 22 constitute a signal processing means.

Further, the CD controller 21 constitutes a signal generating means for generating a signal of which level changes with one EFM frame as a unit in response to presence or absence of data recorded in an optical disc 2.

Next, the operation of the optical disc drive 1 will be described.

While carrying out focus control, tracking control, sled control and rotation control (rotation speed control), the optical disc drive 1 records (writes in) and plays back (read out) information (data) to and from a predetermined track of the optical disc 2. Hereinbelow, the operations carried out during (1) recording, (2) playback (reproduce), (3) focus control, tracking control and sled control, and (4) rotation control (rotation speed control) will be described in this order in this order.

First, as shown in FIG. 2, a predetermined COMMAND signal from the control means 13 is inputted into the CD servo controller 21. Further, a predetermined COMMAND signal from the control means 13 is inputted into the WOBBLE servo controller 22.

These COMMAND signals transmitted from the control means 13 to the CD servo controller 21 and the WOBBLE servo controller 22, respectively, are signals indicating predetermined commands (e.g., to start controls and the like).

Then, a predetermined STATUS signal from the CD servo controller 21 is inputted into the control means 13. Further, a predetermined STATUS signal from the WOBBLE servo controller 22 is inputted into the control means 13.

These STATUS signals are in response to the commands mentioned above, namely, such status signals indicate the statuses for the controls mentioned above (e.g., control success, control failure, control being carried out and other statuses).

(1) Recording

When data (signals) is to be recorded (written in) in the optical disc 2, the pre-groove formed in the optical disc 2 is reproduced (read out), after which the data is recorded in accordance with the pre-groove.

When the data (signals) to be recorded on the optical disc 2 is inputted into the optical disc drive 1 via the interface control section 31, such data is inputted into the EFM/CD-ROM encoder control section 24.

In the EFM/CD-ROM encoder control section 24, the data signal mentioned above is encoded in response to a clock signal (i.e., at the timing of the clock signal) from the clock 34 and then undergoes modulation (EFM modulation) by a modulation method known as EFM (Eight to Fourteen Modulation) to form ENCODE EFM signals.

Figure 3:
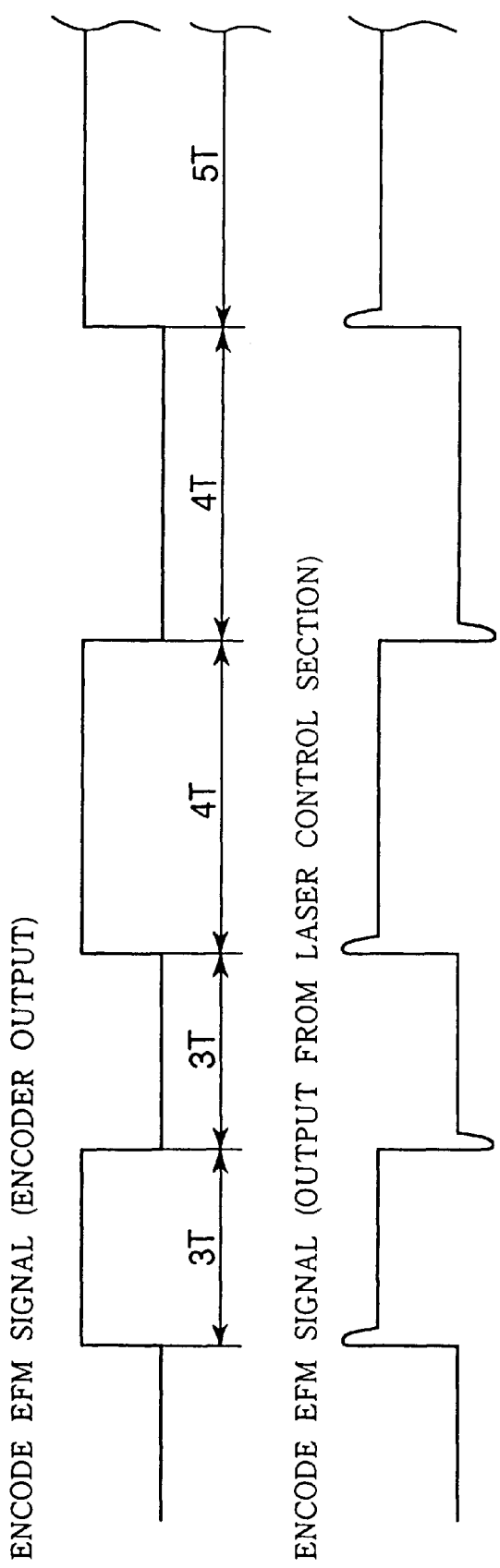
FIG. 3 is a timing chart which shows the ENCODE EFM signal from the EFM/CDROM encoder and the ENCODE EFM signal from the laser control section in the optical disc drive according to the present invention.

As shown in FIG. 3, these ENCODE EFM signals are formed from pulses each having a predetermined length (period) of any one of 3T–11T.

Figure 4:
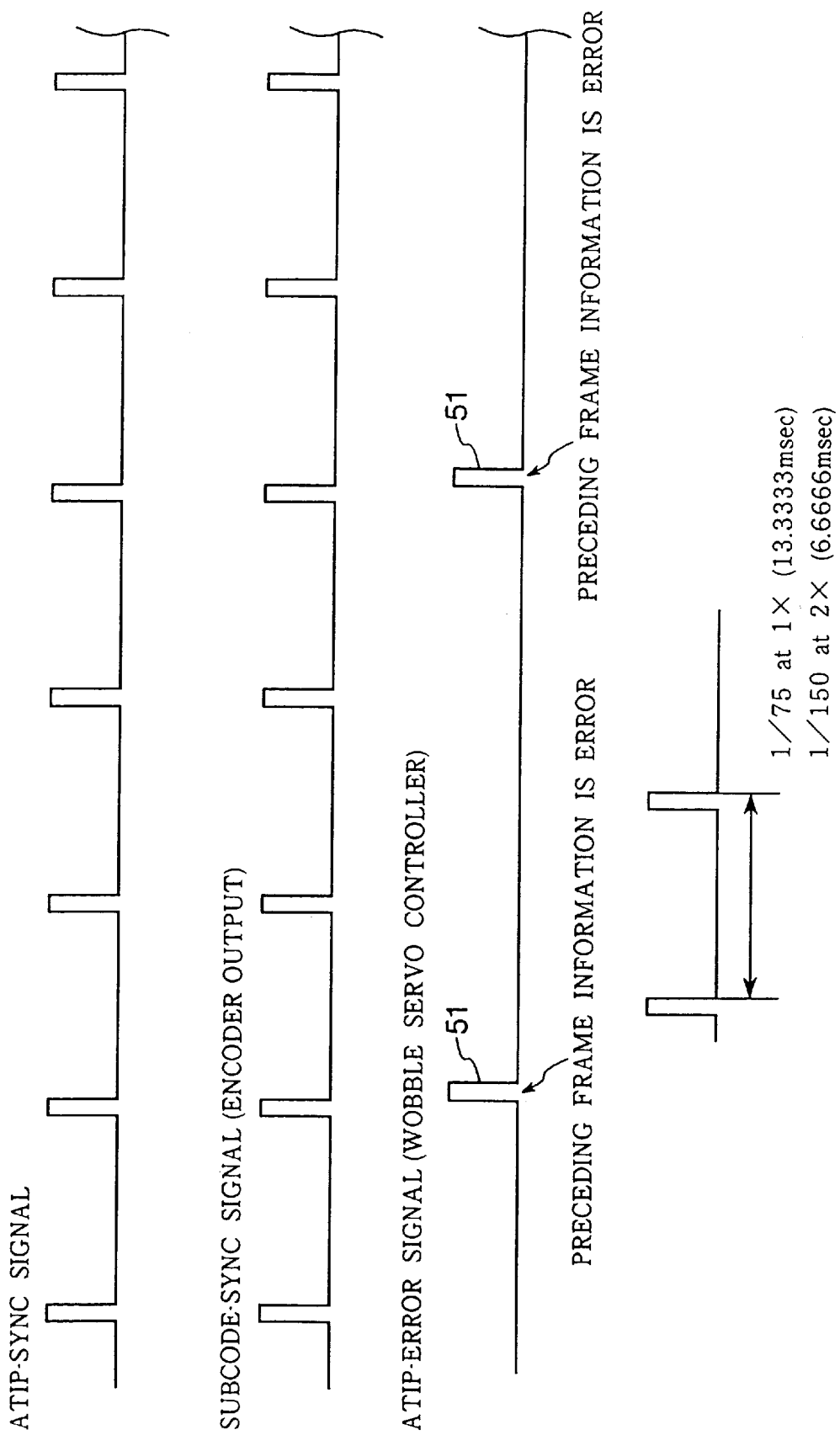
FIG. 4 is a timing chart which shows the ATIP-SYNC signal, the SUBCODE-SYNC signal from the SYNC signal generating/ATIP decoder and the ATIP error signal in the optical disc drive according to the present invention.
Figure 5:
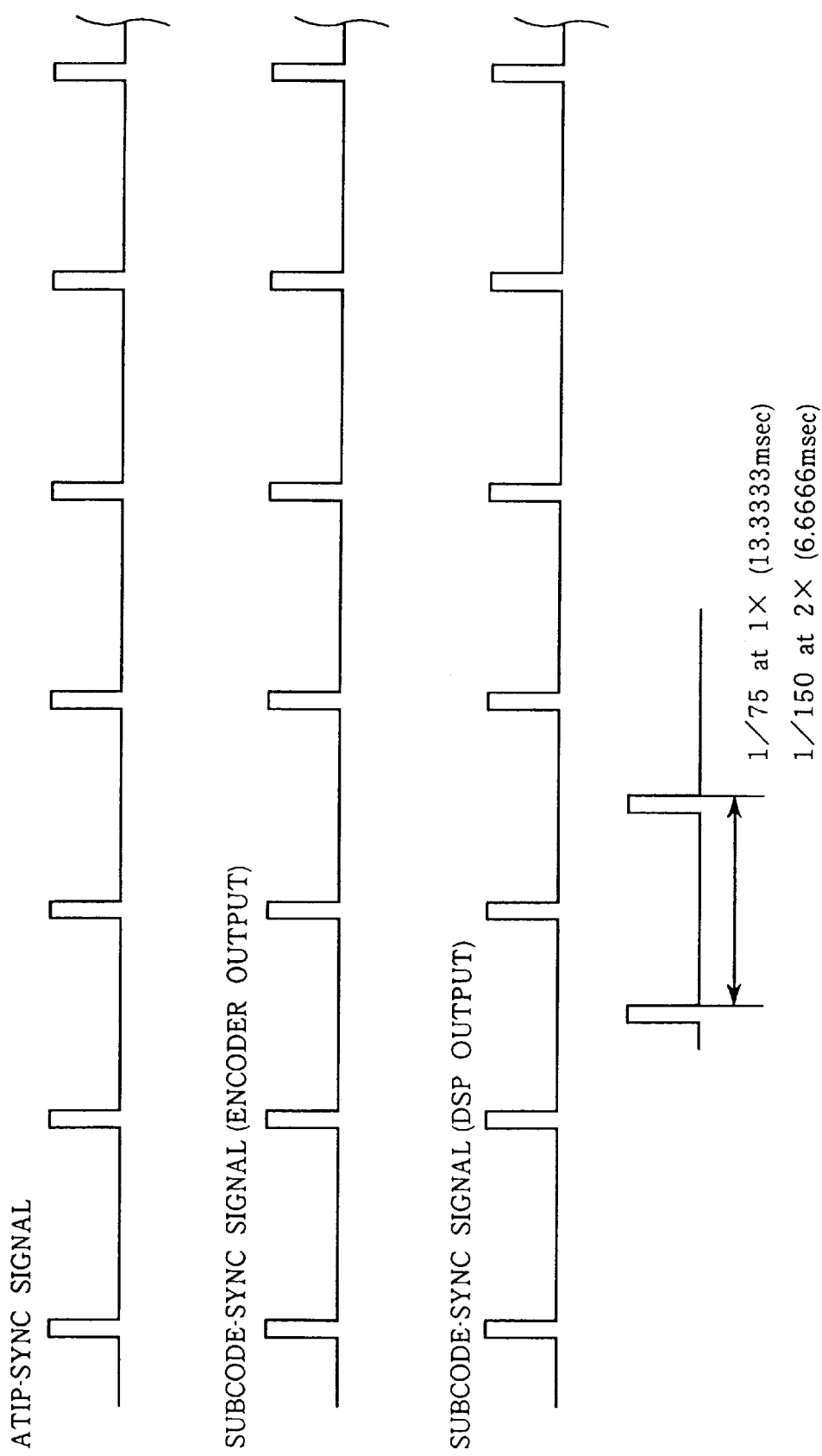
FIG. 5 is a timing chart which shows the ATIP-SYNC signal, the SUBCODE-SYNC signal from the SYNC signal generating/ATIP decoder and the SUBCODE-SYNC signal from the CD servo controller in the optical disc drive according to the present invention.

Further, as shown in FIGS. 4 and 5, in the EFM/CD-ROM encoder control section 24, by dividing the clock signal from the clock 34, a SUBCODE-SYNC signal (used as the second synchronizing signal) in the form of a pulse signal of a predetermined period is generated. The pulse period of this SUBCODE-SYNC signal (i.e., the time interval between adjacent pulses) is 1/75 second for the case of the reference rotation speed (1×) and 1/450 second for the case of the 6 times rotation speed.

During the encoding process described above, a synchronizing signal, namely, a SYNC pattern is added to the ENCODE EFM signal based on the SUBCODE-SYNC signal (i.e., on the timing of the SUBCODE-SYNC signal). Namely, a SYNC pattern is respectively added to the portion corresponding to the head portion of each SUBCODE frame.

This ENCODE EFM signal is inputted into the laser control section 14 from the EFM/CD-ROM encoder control section 24.

Further, an analog WRITE POWER signal (voltage) is outputted from a D/A converter (not shown in the drawings) in the control means 13 and it is then inputted into the laser control section 14.

Based on the ENCODE EFM signal, the laser control section 14 switches the level of the WRITE POWER signal from the control means 13 to a high level (H) or a low level (L), and then outputs such signal, thereby controlling the operations of the laser diode of the optical pick-up 3.

In particular, during the period of time in which the ENCODE EFM signal is in a high (H) level, the laser control section 14 outputs a high level (H) WRITE POWER signal. Namely, the laser output is increased to a level for writing in data. Then, during the period of time in which the ENCODE EFM signal is in a low (L) level, the laser control section 14 outputs a low level (L) WRITE POWER signal. Namely, the laser output is decreased/returned to a level for reading out data.

Thus, when the ENCODE EFM signal level is in the high (H) level, a pit having a predetermined length is formed in the optical disc 2, and when the ENCODE EFM signal level is in the low (L) level, a land having a predetermined length is formed in the optical disc 2.

In this way, data is written (recorded) in a predetermined track of the optical disc 2 in the forms of the thus formed pits and lands.

In the EFM/CD-ROM encoder control section 24, a predetermined ENCODE EFM signal (random EFM signal) is generated in addition to the above-mentioned ENCODE EFM signal. This random EFM signal is used for output adjustment (power control) of the laser when trial writing in a test area is carried out under OPC (Optimum Power Control) procedure.

When trial writing is carried out in a test area under the OPC procedure, the random EFM signal is inputted into the laser control section 14 from the EFM/CD-ROM encoder control section 24.

Further, when trial writing is carried out in a test area during the OPC procedure, 15-step level WRITE POWER signals are generated in the control means 13, and these WRITE POWER signals are outputted from the D/A converter (not shown in the drawings) provided in the control means 13 and then inputted into the laser control section 14.

Then, based on the random EFM signal, the laser control section 14 switches the level of the WRITE POWER signals from the control means 13 to a high level (H) or a low level (L) and then outputs such signals, thereby controlling the operations of the laser diode of the optical pick-up 3. This is done for each of the 15-step level WRITE POWER signals.

In this way, in the OPC procedure, trial writing in a test area can be carried out with laser light having 15-step output levels.

Further, when writing data into the optical disc 2, laser light at a read-out output level is emitted from the laser diode of the optical pick-up 3 onto the pre-groove of the optical disc 2, and the light reflected therefrom is received by the split photodiode of the optical pick-up 3.

Figure 6:
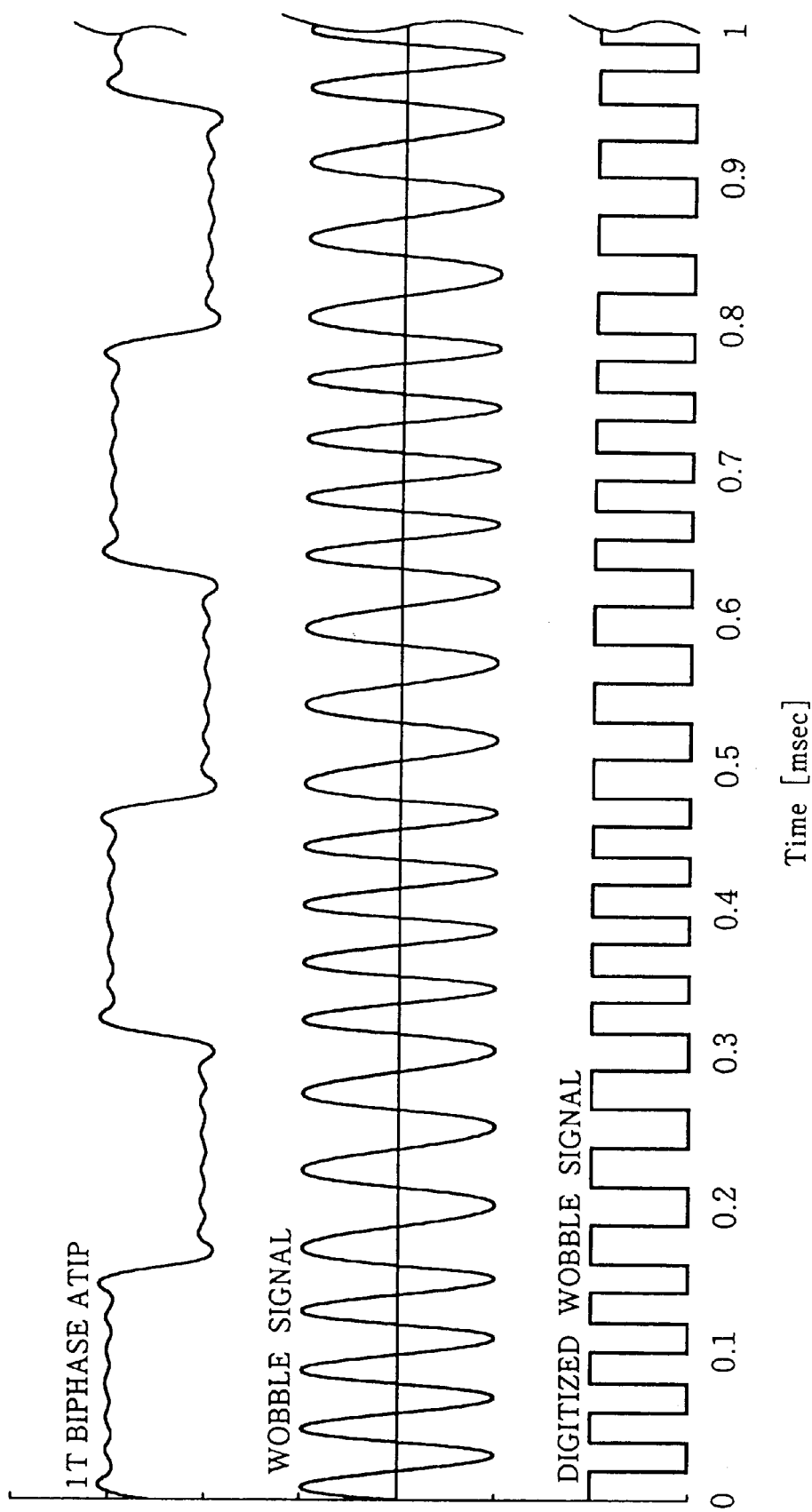
FIG. 6 is a timing chart which shows the 1T Biphase ATIP timing, the WOBBLE signal and the digitized WOBBLE signal in the optical disc drive according to the present invention.

The WOBBLE signal shown in FIG. 6 is outputted from this split photodiode. As was mentioned above, this WOBBLE signal has a 22.05 kHz frequency signal at the reference rotation speed (1×), and includes a signal obtained by biphase modulating the ATIP information and further frequency-modulating it at a carrier frequency of 22.05 kHz.

This WOBBLE signal is inputted into the WOBBLE signal detection circuit 19 where it undergoes digitization.

The digitized WOBBLE signal is then inputted into the WOBBLE servo controller 22.

Figure 7:
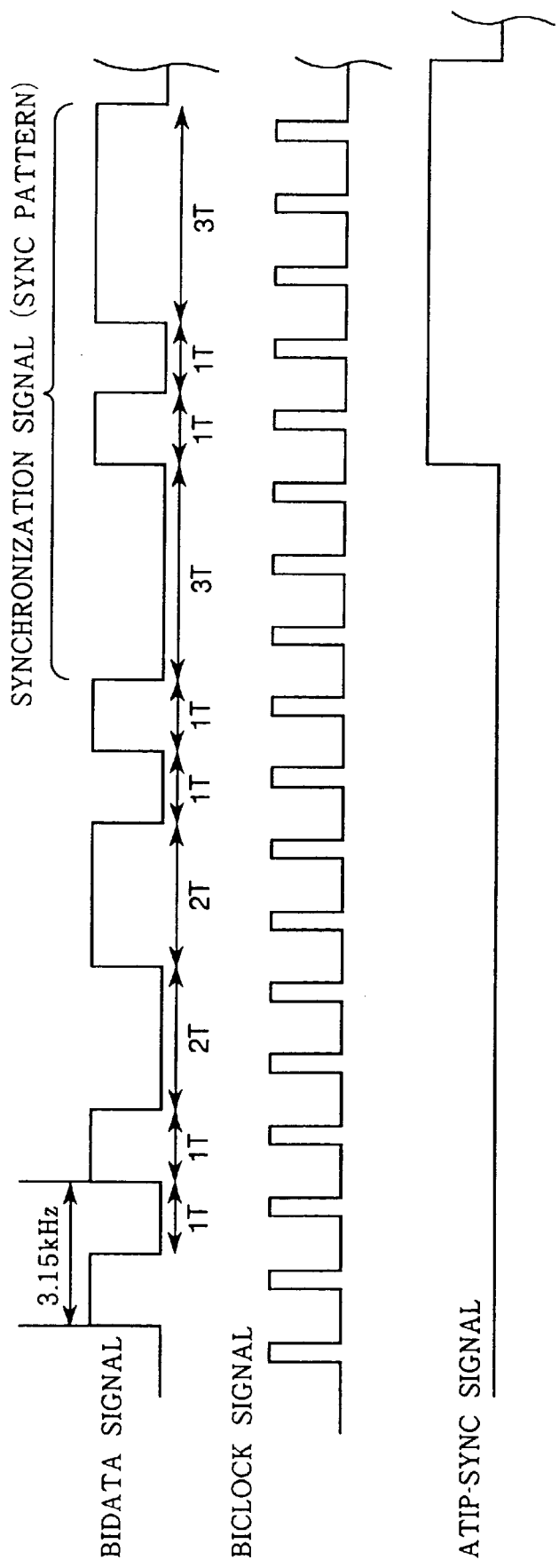
FIG. 7 is a timing chart which shows the BIDATA signal, the BICLOCK signal and the ATIP-SYNC signal in the optical disc drive according to the present invention.

In the WOBBLE servo controller 22, the frequency-modulated ATIP information in the WOBBLE signal is demodulated, and the BIDATA signal (biphase signal) shown in FIG. 7 is obtained. This BIDATA signal is a pulse signal having a length of any one of 1T–3T. Further, by biphase demodulating and then decoding this BIDATA signal, it is possible to obtain the ATIP information.

Further, in a digital PLL circuit (not shown in the drawings) provided in the WOBBLE servo controller 22, a clock is generated based on the BIDATA signal to obtain the BICLOCK signal shown in FIG. 7. This BICLOCK signal is used in timing of decoding the BIDATA signal (described later).

The BIDATA signal and the BICLOCK signal are respectively inputted into the SYNC signal generating/ATIP decoder 27.

In the SYNC signal generating/ATIP decoder 27, the BIDATA signal is biphase demodulated based on the BICLOCK signal, and the biphase demodulated BIDATA signal is then decoded to obtain the ATIP information. Further, the ATIP-SYNC signal (used as the first synchronizing signal) shown in FIG. 7 is also generated.

In this case, as shown in FIG. 7, the ATIP-SYNC signal pulse is generated when the SYNC pattern included in the BIDATA signal is detected. The period of this ATIP-SYNC signal pulse (i.e., the time interval between adjacent pulses) is 1/75 second for the case of the reference rotation speed (1×), and 1/450 second for the case of the six times rotation speed (6×).

This ATIP-SYNC signal is inputted into the control means 13 and the WOBBLE servo controller 22, respectively.

Further, the decoded ATIP information is inputted into the control means 13. In this way, the control means 13 gets a position on the optical disc 2 (the absolute time) from this ATIP information.

The above-mentioned SUBCODE-SYNC signal from the EFM/CD-ROM encoder control section 24 is inputted into the SYNC signal generating/ATIP decoder 27, after which such SUBCODE-SYNC signal is respectively inputted into the control means 13 and the WOBBLE servo controller 22 from the SYNC signal generating/ATIP decoder 27.

FIG. 8 is a chart showing the frame format of the ATIP frame. As shown in this drawing, the frame format of one ATIP frame is comprised of 4-bits for synchronizing signal (Sync); 8-bits for minutes (Min); 8-bits for seconds (Sec); 8-bits for frames (Frame); and 14-bits for error detection code (CRC: Cyclic Redundancy Code).

In the WOBBLE servo controller 22, the ATIP information of each of the ATIP frames undergoes an error detection process (to determine whether or not the ATIP information is wrong).

In this ATIP information error detection process, if the results of a predetermined operation performed on the data of the Sync, Minutes, Seconds and other data of the ATIP frame match the error detection code (CRC), such a state is defined as a "normal", and if the results don't match the error detection code, such a state is defined as a "ATIP error".

In this case, if it is found that the ATIP information is wrong, namely if an ATIP error is detected, a pulse 51 will be generated in the WOBBLE servo controller 22 as an ATIP error signal, and then it is outputted, as shown in FIG. 4.

The ATIP error signal which is formed from the pulse 51 is inputted into a counter (counting means) 131 provided in the control means 13. Then, the number of the pulses of the ATIP error signal is counted by the counter 131, and the number of the pulses of the ATIP error signal is defined as the number of ATIP errors.

Now, because this error detection process is carried out on the ATIP information for every ATIP frame, a maximum of 75 ATIP errors can occur in 75 ATIP frames (in one second at the reference rotation speed (1×)).

In this connection, a detection means for detecting such ATIP errors is constructed from the WOBBLE servo controller 22.

The counted value of the ATIP error is stored in the memory 26 and is also transmitted to the computer 41 via the interface control section 31 to be utilized in examining the optical disc drive 1 (to judge the recording performance of the optical disc drive 1).

The ATIP-SYNC signal inputted into the control means 13 is utilized to the timing of renewal of ATIP time.

Further, the ATIP-SYNC signal inputted into the WOBBLE servo controller 22 is used for synchronization with the SUBCODE-SYNC signal.

The SUBCODE-SYNC signal inputted into the control means 13 is used for compensation (interpolation) of the ATIP time information described hereinbelow and the measurement of the ATIP error described above.

Further, the SUBCODE-SYNC signal inputted into the WOBBLE servo controller 22 is used as a reference signal for synchronization in the same manner as the ATIP-SYNC signal described above.

In this connection, the synchronization is carried out such that the timing of the SUBCODE-SYNC signal in the EFM data generated when writing data becomes substantially synchronized with the timing of the ATIP-SYNC signal obtained from the optical disc 2.

Figure 9:
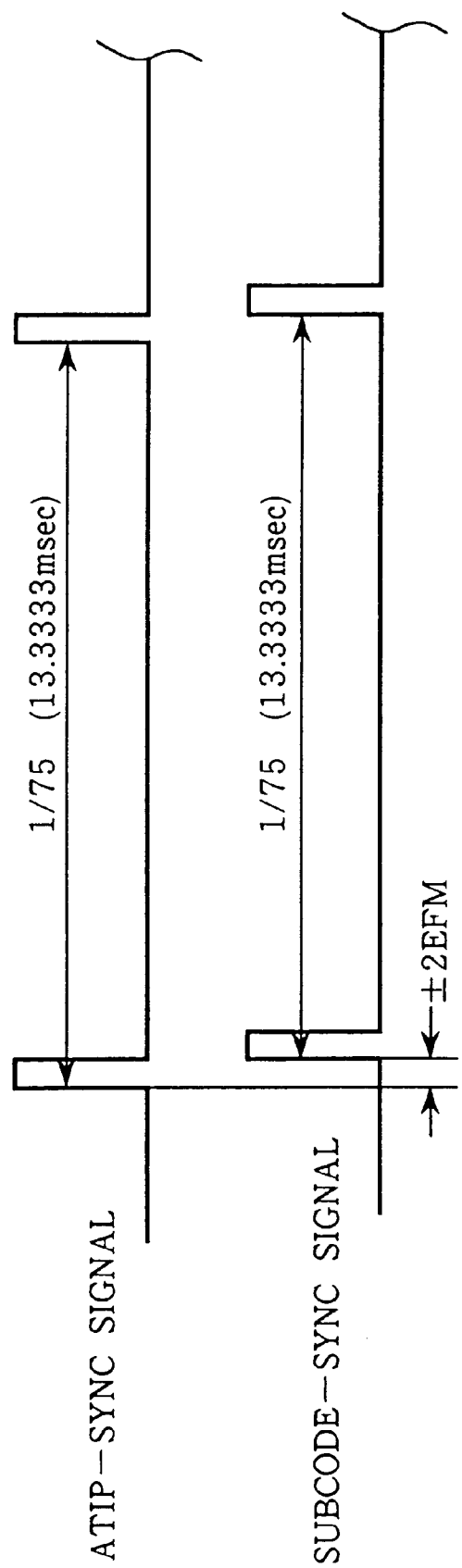
FIG. 9 is a timing chart which shows the ATIP-SYNC signal and the SUBCODE-SYNC signal in the optical disc drive according to the present invention.

As shown in FIG. 9, the SUBCODE-SYNC signal and the ATIP-SYNC signal are normally allowed to shift up to ±2 EFM frames at the respective position on the entire optical disc 2.

(2) Playback

When data (signals) are to be played back (read out) from the optical disc 2, the level of the WRITE POWER signal supplied from the laser control section 14 is maintained at a predetermined DC level corresponding to a read-out output, and in this way, the laser output is maintained at the read-out output level. Normally, the read-out output (the output of the main beam) is set to be equal to or less than 0.7 mW.

Now, when data is being read out from the optical disc 2, laser light at the read-out output is emitted from the laser diode of the optical pick-up 3 onto a predetermined track of the optical disc 2, and the light reflected therefrom is received by the split photodiode of the optical pick-up 3.

Then, electrical currents (voltages) corresponding to the quantity of received light are outputted respectively from each light-receiving portion of the split photodiode of the optical pick-up 3, and these currents, namely, each signal (detected signal) is respectively inputted into the HF signal generating circuit 15 and the error signal generating circuit 18.

In the HF signal generating circuit 15, these detected signals undergo addition, subtraction and the like to generate an HF (RF) signal.

This HF signal is an analog signal corresponding to pits and lands formed in the optical disc 2.

As described above, this HF signal is inputted into the HF signal gain switching circuit 16 and then amplified. The amplification factor of the HF signal gain switching circuit 16 is switched by a gain switching signal from the control means 13.

The amplified HF signal (hereafter, referred to as the "HF signal") is respectively inputted into the peak/bottom detection circuit 17 and the CD servo controller 21.

Further, a tracking error (TE) signal (which is described under sub-title, (3) Focus Control, Tracking Control and Sled Control) is inputted into the peak/bottom detection circuit 17.

Figure 10:
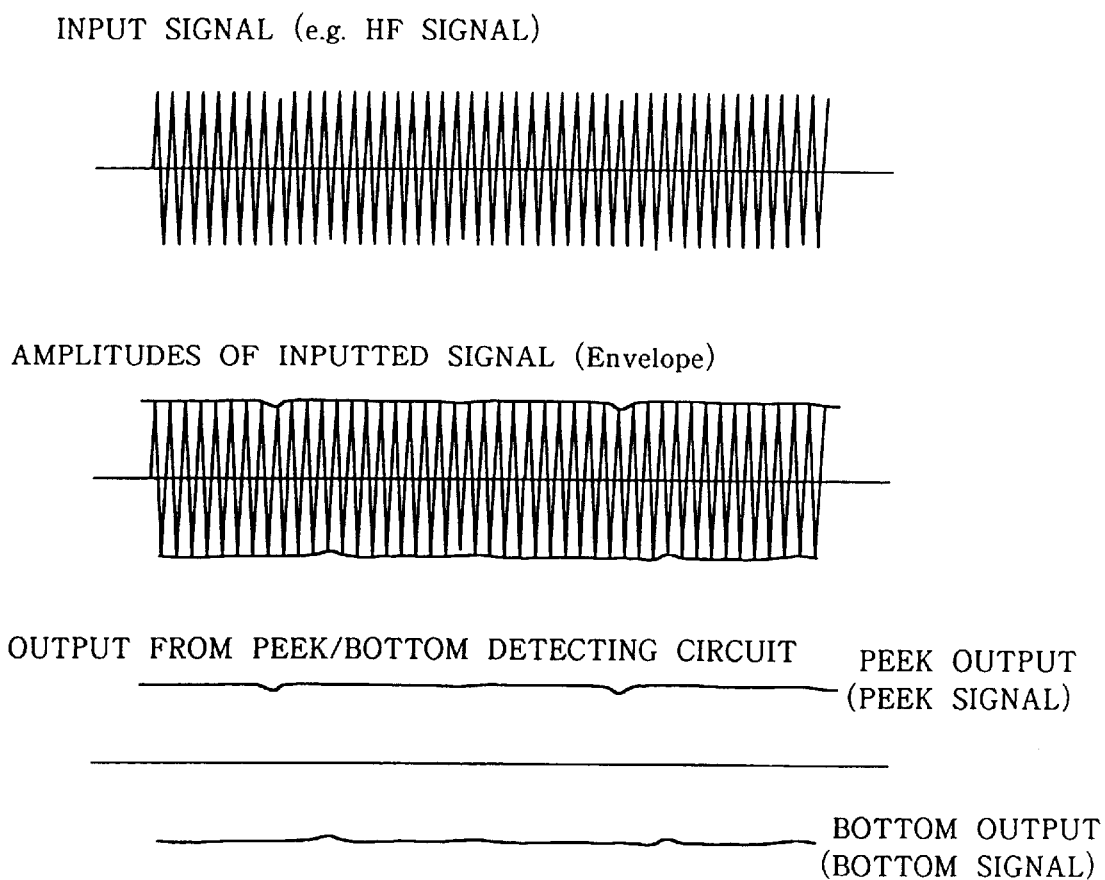
FIG. 10 is a timing chart which shows an input signal inputted to the peek/bottom detecting circuit, the amplitudes of the inputted signal (envelope), and the PEEK signal and the BOTTOM signal in the optical disc drive according to the present invention.

As shown in FIG. 10, in the peak/bottom detection circuit 17, the amplitudes of the inputted signals (envelope), such as the HF signal and the tracking signal, are extracted.

The top and bottom of the amplitude are referred to respectively as the "PEAK" and "BOTTOM", wherein the signal corresponding to the tops of the amplitudes is referred to as "PEEK signal", and the signal corresponding to the bottoms of the amplitudes is referred to as "BOTTOM signal".

The PEEK signal and the BOTTOM signal are respectively inputted into the A/D converter (not shown in the drawings) in the control means 13, and in this A/D converter such signals are converted into digital signals.

These PEAK and BOTTOM signals are used, for example, to measure the amplitude, to adjust the amplitude of the tracking error signal, to calculate the β value in the OPC (Optimum Power Control) procedure, and to determine the presence or absence of the HF signal.

In the CD servo controller 21, the HF signal is digitized and EFM demodulated to obtain an EFM signal. This EFM signal is a signal formed by a pulse having a length (period) corresponding to any one of 3T–11T.

Then, in the CD servo controller 21, an error correction (CIRC error correction) which uses an error correction code referred to as a CIRC (Cross Interleaved Read Solomon Code) is carried out twice on this EFM signal.

In this case, the first CIRC correction is referred to as a "C1 error correction", and the second CIRC correction is referred to as the "C2 error correction".

Further, the case where error correction can not be carried out by the first CIRC correction, namely by the C1 error correction, is referred to as a "C1 error", and the case where error correction can not be carried out by the second CIRC correction, namely by the C2 error correction, is referred to as a "C2 error".

Figure 11:
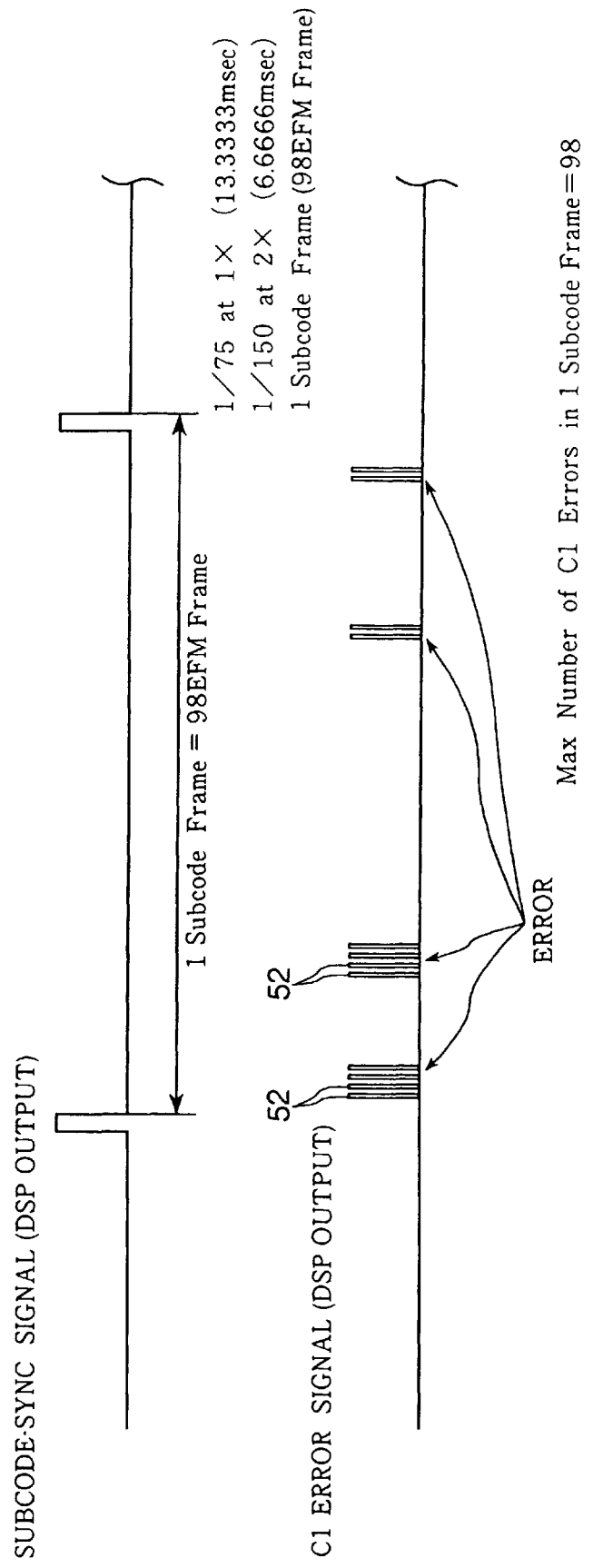
FIG. 11 is a timing chart which shows the SUBCODE-SYNC signal from the CD servo controller and the C1 ERROR signal in the optical disc drive according to the present invention.

As shown in FIG. 11, if a C1 error is detected during the C1 error correction in the CD servo controller 21, a pulse 52 is generated and then it is outputted.

The C1 error signal comprised of the pulses 52 is inputted into the counter 131 of the control means 13. Then, the number of the pulses of the C1 error signal is counted (measured) by the counter 131 as the number of C1 errors.

Now, because one subcode frame is comprised of 98 EFM frames, a maximum number of 7350 C1 and C2 errors can occur respectively in 75 subcode frames (in one second at the reference rotation speed (1×)).

In this regard, it is to be understood that the CD servo controller 21 constitutes a detection means for detecting the C1 error.

The counted value of C1 errors is stored in the memory 26 and is also transmitted to the computer 41 via the interface control section 31 to be utilized in examining the optical disc drive 1 (to judge the playback performance or the recording/playback performance of the optical disc drive 1).

In the CD servo controller 21, the EFM signal after CIRC error correction has been carried out is decoded (converted) into a predetermined format data, namely, a DATA signal.

Next, a description will be given for a typical case in which audio data (music data) is recorded on an optical disc 2 and its EFM signal is decoded into an audio format DATA signal.

Figure 12:
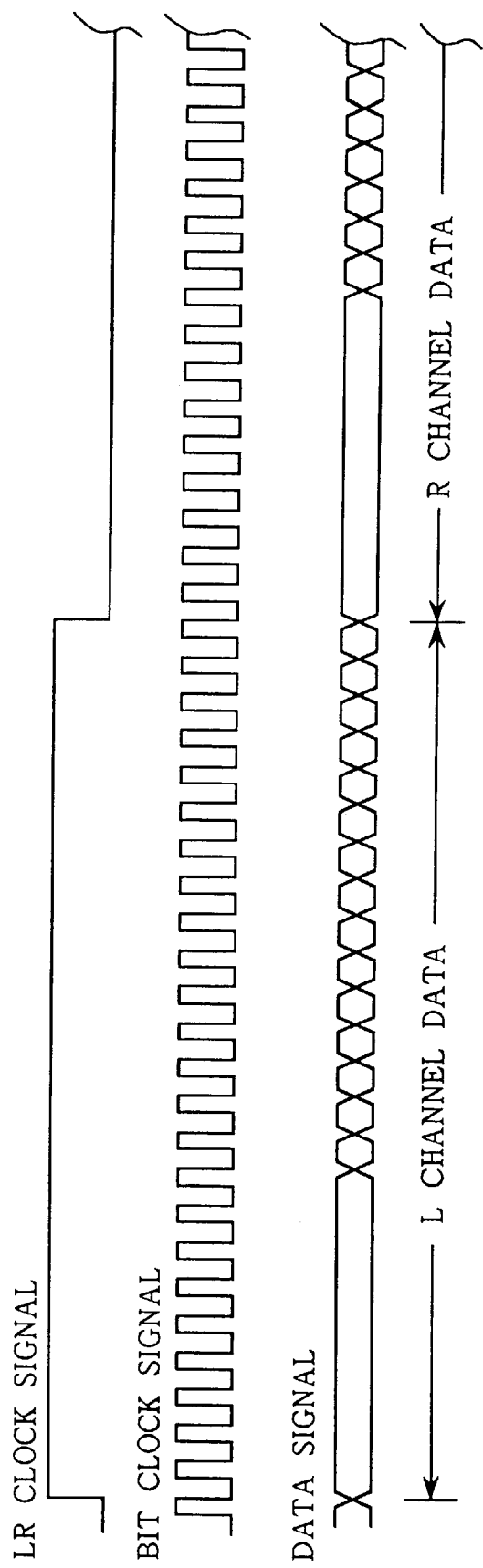
FIG. 12 is a timing chart which shows the DATA signal of an audio format, the LRCLOCK signal and the BITCLOCK signal in the optical disc drive according to the present invention.

In this connection, FIG. 12 is a timing chart showing an audio format DATA signal, an LRCLOCK signal and a BITCLOCK signal.

As shown in this drawing, in the CD servo controller 21, the EFM signal is decoded into a DATA signal comprised of 16-bit L-channel data and 16-bit R-channel data based on a clock signal from the clock 33.

Further, in the CD servo controller 21, the BITCLOCK signal and the LRCLOCK signal are respectively generated based on the clock signal from the clock 33. This BITCLOCK signal is a serial data transfer clock.

Further, the LRCLOCK signal is a signal for discriminating the L-channel data and the R-channel data in the DATA signal. In this case, the high (H) level of the LRCLOCK signal represents the L-channel data, and the low (L) level of the LRCLOCK signal represents the R-channel.

Now, in the case where normal data other than audio data is recorded on the optical disc 2, the EFM signal thereof is also decoded into a DATA signal comprised of the above-mentioned 16-bit L-channel data and 16-bit R-channel data.

The DATA signal, the LRCLOCK signal and the BITCLOCK signal are respectively inputted into the CD-ROM decoder control section 28.

In the case where error correction information such as ECC (Error Correction Code)/EDC (Error Detecting Code) is recorded on the optical disc 2, error correction is carried out for the DATA signal in the CD-ROM decoder control section 28.

This ECC/EDC is an error correction code used in a CD-ROM MODE 1 format. With this error correction, it is possible to reduce the bit error rate to a degree of $10^{-12}$.

Next, in the CD-ROM decoder control section 28, the DATA signal is decoded into predetermined format data for communication (transmission) based on the clock signal from the clock 35, and this decoded data is then transmitted to the computer 41 via the interface control section 31.

In the computer 41, for example, this decoded data is encoded, and then this encoded data is recorded (copied) into a predetermined recording medium (e.g., a hard disc).

Figure 13:
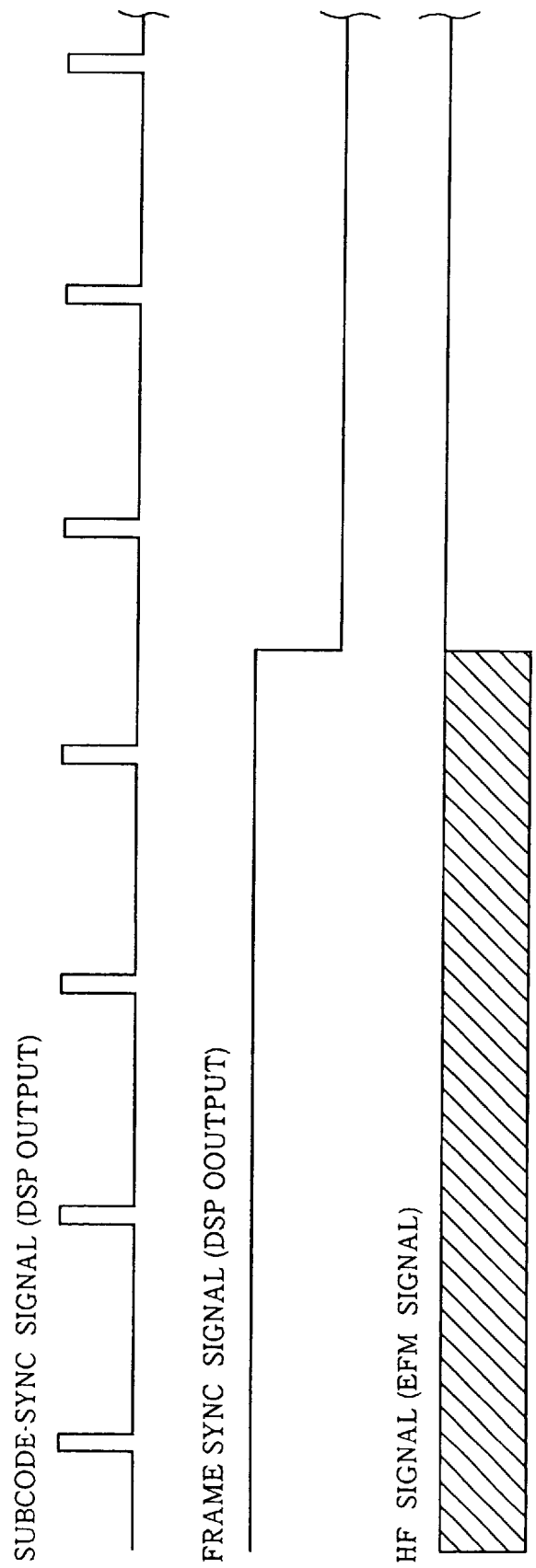
FIG. 13 is a timing chart which shows the SUBCODE-SYNC signal from the CD servo controller, the FRAM SYNC signal, the HF signal (EFM signal) in the optical disc drive according to the present invention.

Further, the FRAME SYNC signal shown in FIG. 13 is generated in the CD servo controller 21.

The level of this FRAME SYNC signal becomes high (H) when the HF signal is inputted into the CD servo controller 21 and the EFM signal is being synchronized at a specified period (3T–11T). Further, if no HF signal becomes inputted (i.e., if there becomes no synchronization of the EFM signal), the level of the FRAME SYNC signal is switched from a high (H) level to a low (L) level at the respective EFM frame unit.

In this regard, it is to be understood that, in the case of the reference rotation speed (1×), the length (period) of one EFM frame is 136 μsec, and 98 EFM frames form one subcode frame.

This FRAME SYNC signal is inputted into the control means 13, and it is used for detecting the termination of the HF signal.

Further, a SUBQ DATA signal is inputted into the control means 13 from the CD servo controller 21.

This SUBQ DATA signal is a signal which represents Q data in the subcode data.

The subcode includes eight types referred to as P, Q, R, S, T, U, V and W. One EFM frame includes a subcode of one byte in which each of P–W data is recorded with one bit, respectively.

Now, because one subcode frame is comprised of 98 EFM frames, with each EFM frame having one bit for each P–W data, there are a total of 98 bits for each P–W data in one subcode frame. However, because the first two EFM frames are used for the SYNC pattern (synchronization signal), there are actually 96 bits for each P–W data.

Next, FIG. 14 is a chart showing the format of the 96 bits of Q data. The CONTROL given by Q1–Q4 (4 bits) shown in this drawing are used to discriminate normal data or audio data.

Further, the ADDRESS given by Q5–Q8 (4 bits) represents the contents of the data in Q9–Q80 (72 bits).

Further, the CRC (Cyclic Redundancy Code) in Q81–Q96 (16 bits) is used to detect errors (to judge whether or not the data is wrong).

Furthermore, from this Q data it is possible to obtain information such as the absolute time information on the optical disc 2, the information of the present track, lead-in and lead-out, the music number, and a TOC (Table of Contents) recorded in the lead-in area.

The control means 13 obtains such information from the Q data and then carries out predetermined operations.

Further, the SUBCODE-SYNC signal is inputted into the control means 13 from the CD servo controller 21.

Figure 15:
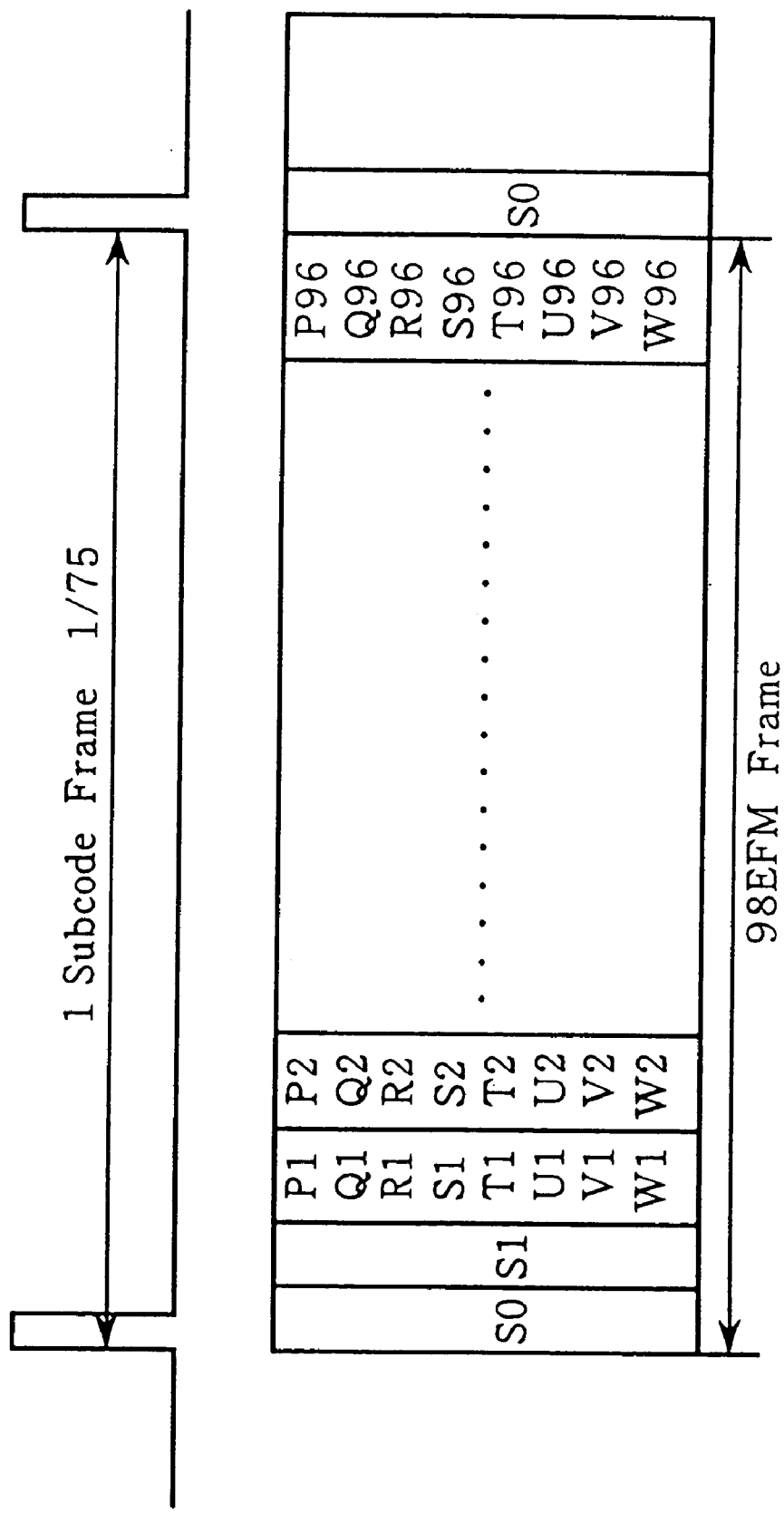
FIG. 15 is a drawing which shows one subcode frame.

Now, as shown in FIG. 15, there are 98 bytes of subcode data in 98 EFM frames, and as mentioned above, the SYNC pattern (synchronization signal) is recorded in the two bytes which form the first two EFM frames, namely, S0 and S1.

When this SYNC pattern is detected, the CD servo controller 21 generates a pulse and then outputs it. Namely, a pulse is generated and outputted for every subcode frame (98 EFM frames). The signal which is formed by this pulse is the SUBCODE-SYNC signal. Further, the SYNC pattern is outputted 75 times every second in the case of the reference rotation speed (1×), as described above.

Further, in the CD servo controller 21, the Q data is renewed after the SUBCODE-SYNC signal pulse has been detected. Then, the renewed Q data is read into the control means 13.

(3) Focus Control, Tracking Control and Sled Control

In the error signal generating circuit 18, a focus error (FE) signal, a tracking error (TE) signal and a sled error (SE) signal are respectively generated by carrying out addition and subtraction and the like on the detection signal from the split photodiode.

The focus error signal is a signal which represents the amount of displacement of the objective lens along the rotational axial direction away from the focus position (i.e., the amount of the displacement of the objective lens from the focus position) and the direction thereof.

The tracking error signal is a signal which represents the amount of displacement of the objective lens along a radial direction from the center of the track (Pre-groove) (i.e., the amount of the displacement of the objective lens from the center of the track) and the direction thereof.

Further, the sled error signal is a signal used for sled control, namely, in the sled servo (i.e., the servo for moving the pick-up base of the optical pick-up 3). In other words, the sled error signal is a signal which represents the amount of the displacement of the optical pick-up 3 along a radial direction (i.e., the moving direction of the optical pick-up 3)

from the target position (proper position) of the optical pick-up 3 and the direction thereof.

The focus error signal is inputted into the CD servo controller 21. Further, the tracking error signal is also inputted into the CD servo controller 21 and into the peak/bottom detection circuit 17, respectively, as described above. Furthermore, the sled error signal is also inputted into the CD servo controller 21.

Using these focus error signal, tracking error signal and sled error signal, the optical disc drive 1 carries out focus control, tracking control and sled control for a predetermined track.

During focus control, a focus PWM (Pulse Width Modulation) signal for controlling the driving of the actuator 4 along the rotational axial direction is generated in the CD servo controller 21. This focus PWM signal is a digital signal (continuous pulse).

The focus PWM signal is inputted into the PWM signal smoothing filter 7 from the CD servo controller 21 and undergoes smoothing, namely, the focus PWM signal is converted into a control voltage (control signal), and it is then inputted into the driver 6. Then, based on such control voltage, the driver 6 applies the focus signal (predetermined voltage) to the actuator 4 to drive the actuator 4 in the rotational axial direction (focus direction).

In this case, the CD servo controller 21 adjusts the pulse width (duty ratio) of the focus PWM signal so that the level of the focus error signal becomes zero (i.e., the level is reduced as much as possible), and reverses the code of the focus PWM signal (pulse/minus sign). In this way, the objective lens of the optical pick-up 3 is positioned at the focus position. Namely, the focus servo is operated.

Further, during tracking control, a tracking PWM signal for controlling the driving of the actuator 4 along the radial direction is generated in the CD servo controller 21. This tracking PWM signal is also a digital signal (continuous pulse).

The tracking PWM signal is inputted into the PWM signal smoothing filter 7 from the CD servo controller 21 and undergoes smoothing, namely, the tracking PWM signal is converted into a control voltage (control signal), and it is then inputted into the driver 6. Then, based on such control voltage, the driver 6 applies the tracking signal (predetermined voltage) to the actuator 4 to drive the actuator 4 in the radial direction (tracking direction).

In this case, the CD servo controller 21 adjusts the pulse width (duty ratio) of the tracking PWM signal so that the level of the tracking error signal becomes zero (namely, the level is reduced as much as possible), and reverses the code of the tracking PWM signal (pulse/minus sign). In this way, the objective lens of the optical pick-up 3 is being positioned at the center of the track (Pre-groove). Namely, the tracking servo is operated.

Further, during the sled control, a sled PWM signal for controlling the driving of the sled motor 5 is generated in the CD servo controller 21. This sled PWM signal is also a digital signal (continuous pulse).

The sled PWM signal is inputted into the PWM signal smoothing filter 7 from the CD servo controller 21 and undergoes smoothing, namely, the sled PWM signal is converted into a control voltage (control signal), and it is then inputted into the driver 6. Then, based on such control voltage, the driver 6 applies the sled signal (predetermined voltage) to the sled motor 5 to rotationally drive the sled motor 5.

In this case, the CD servo controller 21 adjusts the pulse width (duty ratio) of the sled PWM signal so that the level of the sled error signal becomes zero (i.e., to reduce the level as much as possible), and reverses the code of the sled PWM signal (pulse/minus sign). In this way, the pick-up base of the optical pick-up 3 is positioned at the target position (proper position). Namely, the sled servo is operated.

Further, in addition to tracking control, the tracking error signal is also used, for example, to control the movement of the optical pick-up 3 toward a predetermined track (target track) of the optical disc 2 (i.e., to control track jump operations).

(4) Rotation Number Control (Rotation Speed Control)

In the optical disc drive 1, the rotation speed (rotation number) of the spindle motor 8 is controlled during the recording and reproducing operation.

The methods of controlling the rotation number (rotation speed) of the spindle motor 8 is called as a spindle servo, and the spindle servo includes a method using a WOBBLE PWM (Pulse Width Modulation) signal, namely, a spindle servo which uses the WOBBLE signal (hereinafter, referred to as "WOBBLE servo"); a method using an FG PWM signal, namely, a spindle servo which uses an FG signal (hereinafter, referred to as "FG servo"); and a method using an EFM PWM signal, namely, a spindle servo which uses the EFM signal (hereinafter, referred to as "EFM servo"). These will be described below in the order mentioned above.

The WOBBLE PWM signal is a signal for controlling the spindle motor, and it is generated by the WOBBLE servo controller 22. The WOBBLE PWM signal is a digital signal (continuous pulse) having a level of 0–5V.

This WOBBLE PWM signal is inputted into the PWM signal smoothing filter 12 from the WOBBLE servo controller 22 and undergoes smoothing, namely, the WOBBLE PWM signal is converted into a control voltage (control signal), and it is then inputted into the driver 11. Then, based on such control voltage, the driver 11 rotationally drives the spindle motor 8.

In this case, the WOBBLE servo controller 22 adjusts the pulse width (duty ratio) of the WOBBLE PWM signal so that the frequency (cycle) of the WOBBLE signal becomes the target value (e.g., 22.05 kHz at the reference rotation speed (1×)). In this way, the spindle servo is operated so as to set the rotation number (rotation speed) of the spindle motor 8 at a target value (a first target rotation number or a second target rotation number described later).

The FG PWM signal is a signal for controlling the spindle motor, and it is generated by the control means 13. The FG PWM signal is a digital signal having a level of 0–5V (continuous pulse).

This FG PWM signal is inputted into the PWM signal smoothing filter 12 from the control means 13 and undergoes smoothing, namely, the FG PWM signal is converted into a control voltage (control signal), and it is then inputted into the driver 11. Then, based on such control voltage, the driver 11 rotationally drives the spindle motor 8.

On the other hand, a FG (Frequency Generator) signal corresponding to the rotation number (rotation speed) of the spindle motor 8 is outputted from the Hall element 9. This FG signal is digitized by the FG signal digitization circuit 23 and such a digitized signal is then inputted into a frequency measurement (cycle measurement) section 132 of the control means 13.

In the frequency measurement section 132 of the control means 13, the frequency (cycle) of the FG signal is measured based on the clock signal from the clock 32. Then, the control means 13 adjusts the pulse width (duty ratio) of the FG PWM signal so that the frequency (cycle) of the FG signal becomes the target value. In this way, the spindle servo is operated to set the rotation number (rotation speed) of the spindle motor 8 at the target rotation number.

The EFM PWM signal is a signal for controlling the spindle motor, and it is generated by the CD servo controller 21 as described above. The EFM PWM signal is a digital signal having a level of 0–5V level (continuous pulse).

This EFM PWM signal is inputted into the PWM signal smoothing filter 12 from the CD servo controller 21 and undergoes smoothing, namely, the EFM PWM signal is converted into a control voltage (control signal), and it is then inputted into the driver 11. Then, based on such control voltage, the driver 11 rotationally drives the spindle motor 8.

In this case, the CD servo controller 21 adjusts the pulse width (duty ratio) of the EFM signal so that the EFM signal, that is a period of a predetermined pulse selected from the 3T–11T period pulses becomes the target value at any portions on the optical disc. In this way, the spindle servo is operated to set the rotation number (rotation speed) of the spindle motor 8 at the target rotation number.

The optical disc drive 1 as described above is constructed so as to be able to detect an end portion of recorded data (that is, EFM data) recorded in an optical disc 2. Hereinbelow, a description will be made with regard to the detection (retrieval) of the end portion of the recorded data recorded in an optical disc 2.

When data is to be recorded into an optical disc 2, the data is recorded from the inner side of the optical disc 2 toward the outer side of the optical disc 2. In the case where the recording operation for recording the data to the optical disc 2 is stopped or terminated by a command from the computer 41 or according to a program, data is normally recorded up to the 26th EFM frame, as shown in FIG. 16(*a*). In this case, time information (positional information on the optical disc 2) which shows the end portion of the recorded data recorded in the optical disc 2 is written into a PMA (Program Memory Area) in the optical disc 2 in the form of the time information concerning the start and end of that track. Therefore, it is possible to specify the end portion of the recorded data recorded in the optical disc 2 based on the time information stored in the PMA.

On the other hand, however, in the case where the recording operation is interrupted or stopped since tracking servo is disengaged or disenabled due to vibration or the like so that the recording operation can no longer be continued (hereinafter, this situation is referred to as "stop of recording operation by trouble"), a position of an end portion of the recorded data varies depending on a position of the optical pick-up 3 relative to the optical disc 2. In such a case, however, it is possible to know that the end portion of the recorded data is positioned between the next EFM frame of the 26th EFM frame that includes the end portion of the recorded data recorded in the previous recording operation (that is, the 27th EFM frame) and the last EFM frame on the optical disc 2 to which data can be recorded.

Therefore, in this embodiment, in the case where the recording operation has been stopped by trouble during the second or succeeding recording operation, the detection starting time (detection starting position) for the end portion of the recorded data is set at the 27th EFM frame which is next to the 26th EFM frame that includes the end portion of the recorded data recorded in the previous recording operation. On the other hand, however, in the case where the recording operation has been stopped by trouble during the initial recording operation to a non-recorded optical disc (unused disc), the detection starting time for the end portion of the recorded data (detection starting position) is set at the first data-recordable EFM frame located at the innermost portion of the data recording area of the non-recorded optical disc.

Further, the detection ending time (detection ending position) for the detection of the end portion of the recorded data is set at the last data-recordable EFM frame located at the outermost portion of the data recording area of the non-recorded optical disc.

As described above, since the time information which shows the end portion of the recorded data recorded in an optical disc 2, that is the 26th EFM frame, is stored in the PMA of the optical disc 2, the control means 13 can grasp the detection starting time for the end portion of the recorded data from the stored time information.

Further, the control means 13 can also grasp the first data-recordable EFM frame of a non-recorded optical disc 2 and the last data recordable EFM frame thereof.

FIGS. 17(*a*) and 17(*b*) and FIGS. 18(*a*) and 18(*b*) are charts for explaining how to detect the end portion of the recorded data in the optical disc 2 by the optical disc drive 1. In these drawings, the left side is the inner side of the optical disc 2 and the right side is the outer side of the optical disc 2.

As shown in FIG. 17(*a*), when the end portion of the recorded data recorded in the optical disc 2 is to be detected, the number of tracks "N" which lies between the detection starting position and the detection ending position is first obtained. Then, the thus obtained number of tracks "N" is divided by "m" (here, "m" is an integer equal to or greater than 3). In this case, the number of tracks included in each divided portion is defined as S, that is S=N/m.

In this connection, it is preferable that "m" is equal to or greater than 4. Further, it is more preferable that "m" is 8 to 20, and it is most preferable that "m" is 8 to 10.

In this embodiment, the number of tracks "N" is divided by 10, that is, "m" is 10, and S=N/10.

Next, a tack jump operation is carried out to move the optical pick-up 3 from the detection starting position toward the outer circumferential direction for S tracks, and then at that position (at a track to which the pick-up 3 has been moved), that is at the first divided point, detection is carried out to know whether or not EFM data is existed, that is to examine as to whether or not data is recorded.

In this case, the fact that EFM data is detected means that the end portion of the recorded data should lie in a region which is closer to the outer circumference than that position (divided point). On the other hand, the fact that no EFM data is detected means that the end portion of the recorded data should lie in the divided region between the position (divided point) where the detection is carried out and a position which is shifted toward the inner side for S tracks from the divided point.

Therefore, when EFM data is detected, another track jump is carried out again to move the optical pick-up 3 toward the outer circumferential direction for S tracks, and at that position (that is, at the second divided point) detection is carried out again to examine whether or not EFM data becomes existed. This operation is repeatedly continued until no EFM data becomes detected, or until the total number of the track jump operations reaches 9 times.

As described above, the fact that no EFM data is detected means that the end portion of the recorded data should lie in the divided region between the position (divided point) where the detection has been carried out and the just preceding divided point which is shifted to the inner side for S tracks from the position. Therefore, the number of the tracks contained in this divided region is then divided by 10.

Specifically, when no EFM data is detected, ATIP time information (A) is obtained at the position where the detection has been carried out, as shown in FIG. 17(*a*), and then a track jump is carried out to move the optical pick-up 3 toward the inner side for S tracks, and at that position ATIP time information (B) is obtained.

Then, the difference between the time information (A) which shows the position from which the track jump has been started and the time information (B) which shows the present position of the optical pick-up 3 is calculated to obtain N2 which means the number of tracks that lies between the position represented by the time information (A) and the position represented by the time information (B). Then, N2 is defined as the number of tracks N, and the number of tracks N is then divided by 10. Here, the number of tracks lies within each divided portion is defined as S, that is S=N/10. Further, the time information (B) is used as a detection starting time and the time information (A) is used as a detection ending time.

Figures 18A, 18B:
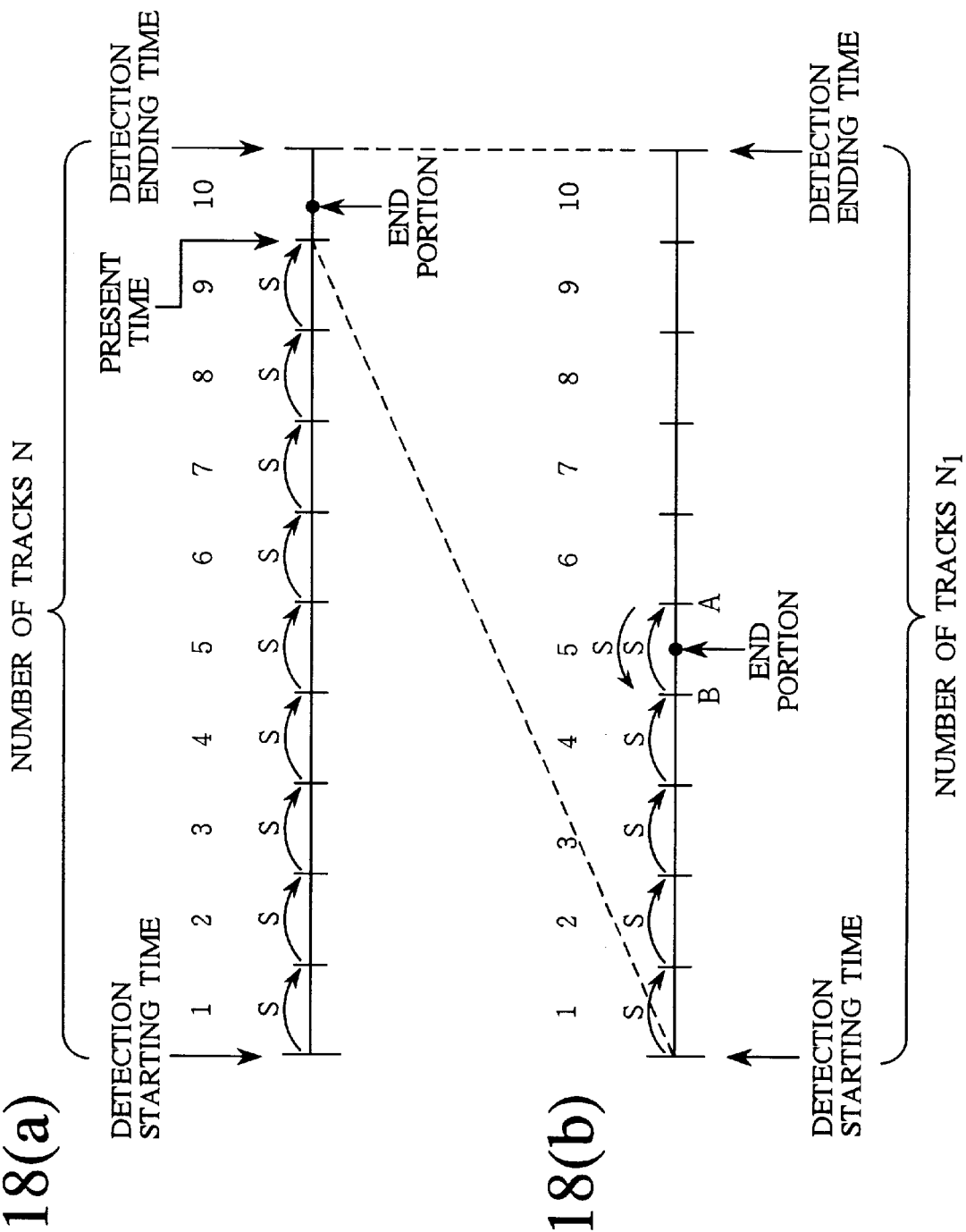
FIG. 18(a) and 18(b) are another chart for explaining the method of detecting the end portion of the recorded data recorded in an optical disc loaded in the optical disc drive of the present invention.

On the other hand, in the case where EFM data is detected at the position which has been reached by the 9 times track jump operations as shown in FIG. 18(a), the end portion of the recorded data lies between the position represented by the present time and the position represented by the detection ending time.

Therefore, in the case where EFM data is detected at a position that reaches after 9 times track jump operations, ATIP time information for that position (the 9th divided point) is obtained, and then, as shown in FIG. 18(b) the number of tracks N1 between the position represented by the detection ending time and the position represented by the present time is obtained. Then, N2 is defined as the number of tracks N, and the number of tracks N is then divided by 10. Here, the number of tracks lies within each divided portion is defined as S, that is S=N/10. Further, the present time is used as a detection starting time.

As shown in FIG. 17(b) and FIG. 18(b), in both cases, track jump operations are then carried out toward the outer circumferential direction from the detection starting time to move the optical pick-up 3 for S tracks, and at that position (divided point) detection for EFM data is carried out.

When EFM data is detected, a track jump operation is carried out again toward the outer circumferential direction for S tracks, and detection for EFM data is carried out at that position. This operation is repeatedly continued until no EFM data becomes detected, or until the total number of the track jump operations reaches 9 times.

The operations to be performed after EFM data has not been detected and the operations to be performed when EFM data is detected at a position after 9 times track jump operations are the same as those described above.

The operations described above are carried out repeatedly until the time interval between the time information (A) and the time information (B) (the interval between the adjacent divided points) becomes less than a predetermined length. In other words, the operations are carried out repeatedly until the number of subcode frames F between the time information (A) and the time information (B) becomes less than a predetermined value, e.g. 150 in this embodiment.

When the number of subcode frames F becomes less than 150, a playing back mode (reproducing mode) is setup, and detection for EFM data is carried out continuously toward the position represented by the time information (A) from the position represented by the time information (B). Namely, detection is carried out continuously to examine as to whether EFM data is recorded or not. In this case, EFM data will not be detected after a predetermined time is elapsed. The end portion of the EFM data is included in the subcode frame at which EFM data is not detected.

In this way, in the present invention, the end portion of EFM data is detected with one subcode frame as a unit, and thereafter detection of the end portion of the data is carried out with one EFM frame as a unit as described later.

Next, explanation will be made with regard to the operation of the control means 13 in the optical disc drive 1 at the time when the end portion of the recorded data recorded in an optical disc 2 is to be detected.

Figure 19:
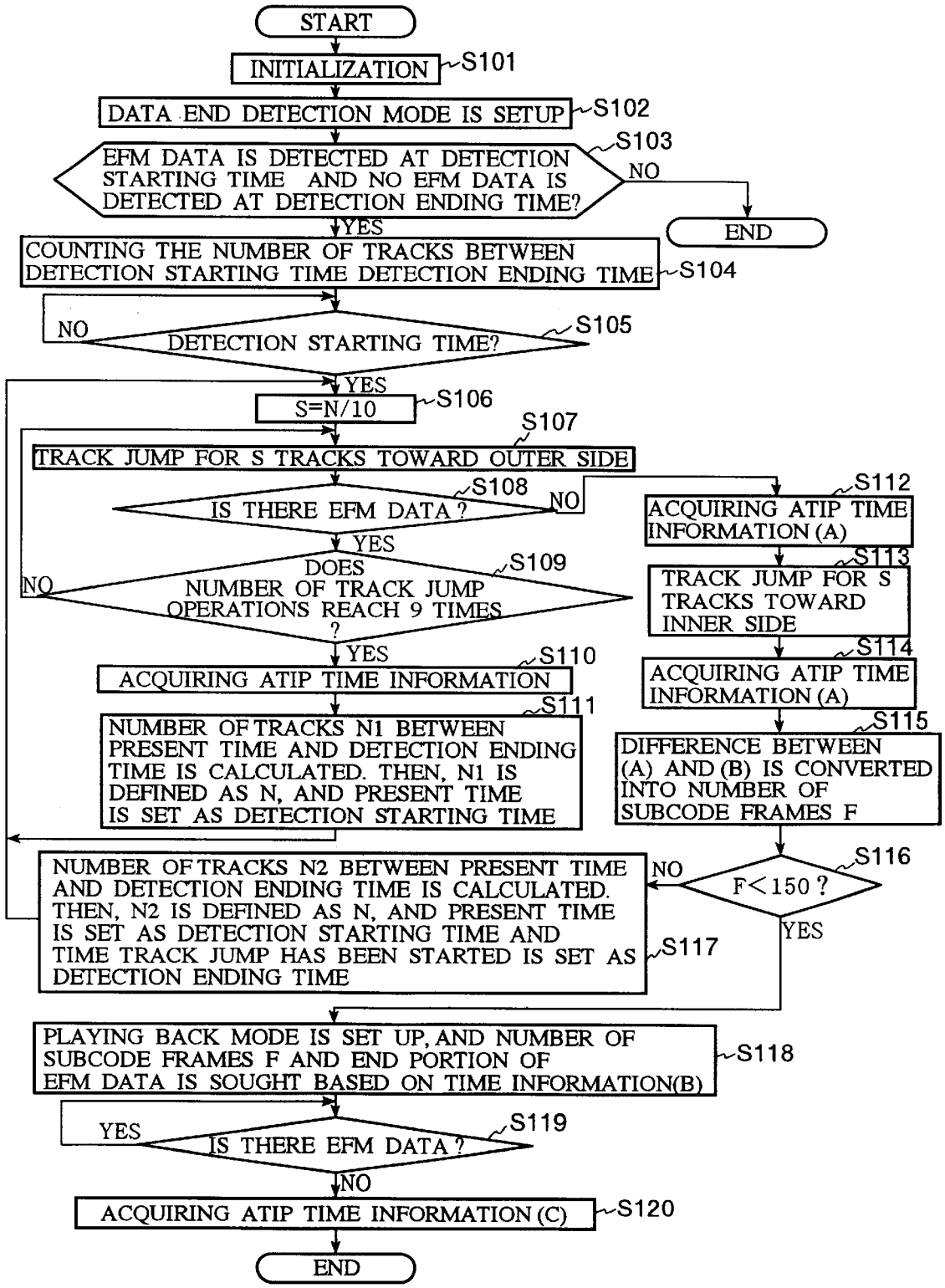
FIG. 19 is a flow chart which shows operation of the control means at the time when the end portion of the recorded data recorded in an optical disc is to be detected.
Figure 20:
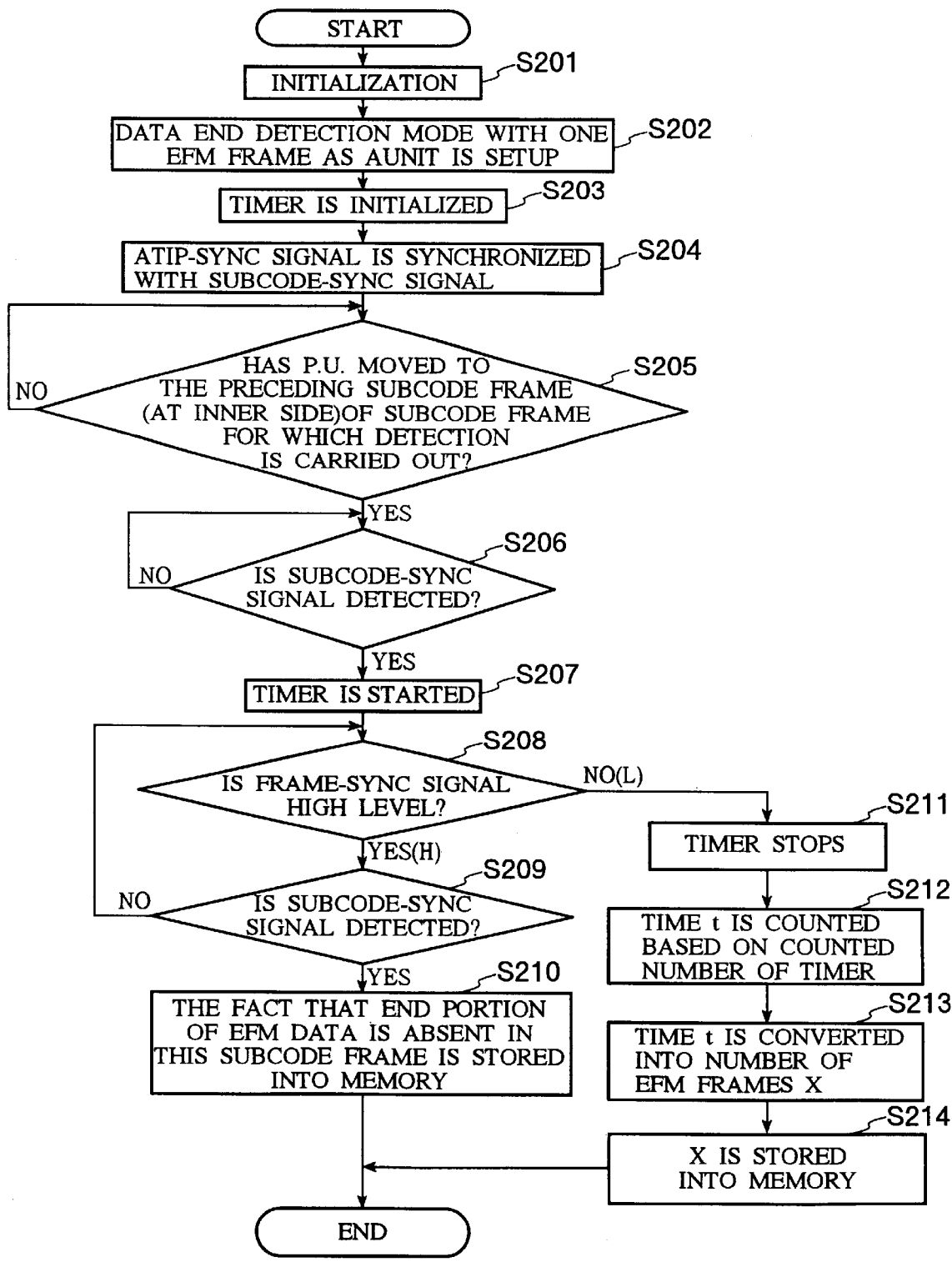
FIG. 20 is a flow chart which shows another operation of the control means at the time when the end portion of the recorded data recorded in an optical disc is to be detected.

FIG. 19 and FIG. 20 are flow charts which show the operation of the control means 13 at the time when the end portion of the recorded data recorded in an optical disc 2 is to be detected. Hereinafter, explanation will be made based on these flow charts.

When a command for detecting an end portion of recorded data recorded in an optical disc 2 is received from a computer 41, the programs (a routine for detecting an end portion of recorded data and a routine for detecting an end portion of recorded data with one EFM frame as a unit) are executed.

First, initialization is carried out at Step S101. In this Step S101, a predetermined address of the memory 26 (that is, an area to which data concerning the time C described later is to be stored) is initialized, for example.

Next, a detection mode for detecting an end portion of recorded data is setup at Step S102. Then, a judgement is made as to whether or not EFM data is recorded at a position represented by the detection starting time and no EFM data is recorded at a position represented by the detection ending time (Step S103).

In this Step S103, in the case where the levels of the PEEK signal and the BOTTOM signal exceed predetermined reference values, it is judged that EFM data is recorded. On the other hand, in the case where the levels of the PEEK signal and the BOTTOM signal do not exceed the predetermined reference values, it is judged that no EFM data is recorded.

Figure 16A:
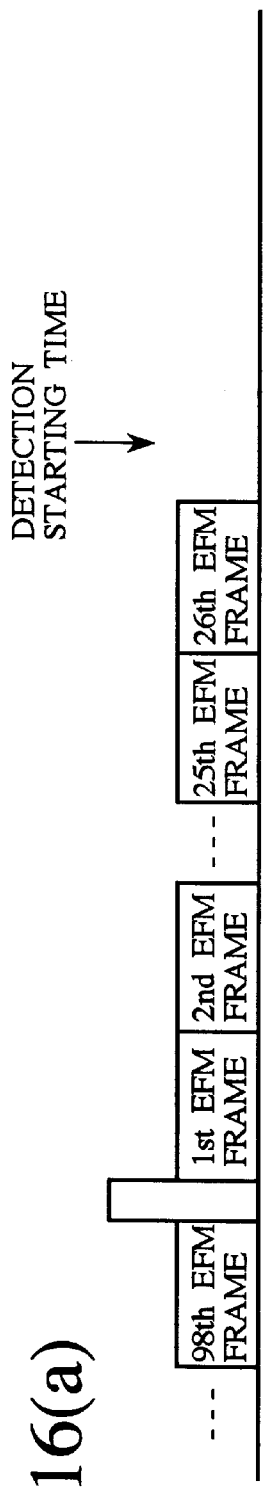
FIGS. 16(a) and 16(b) are a schematic drawing which shows EFM frames of the data recorded in the optical disc.
Figure 16B:
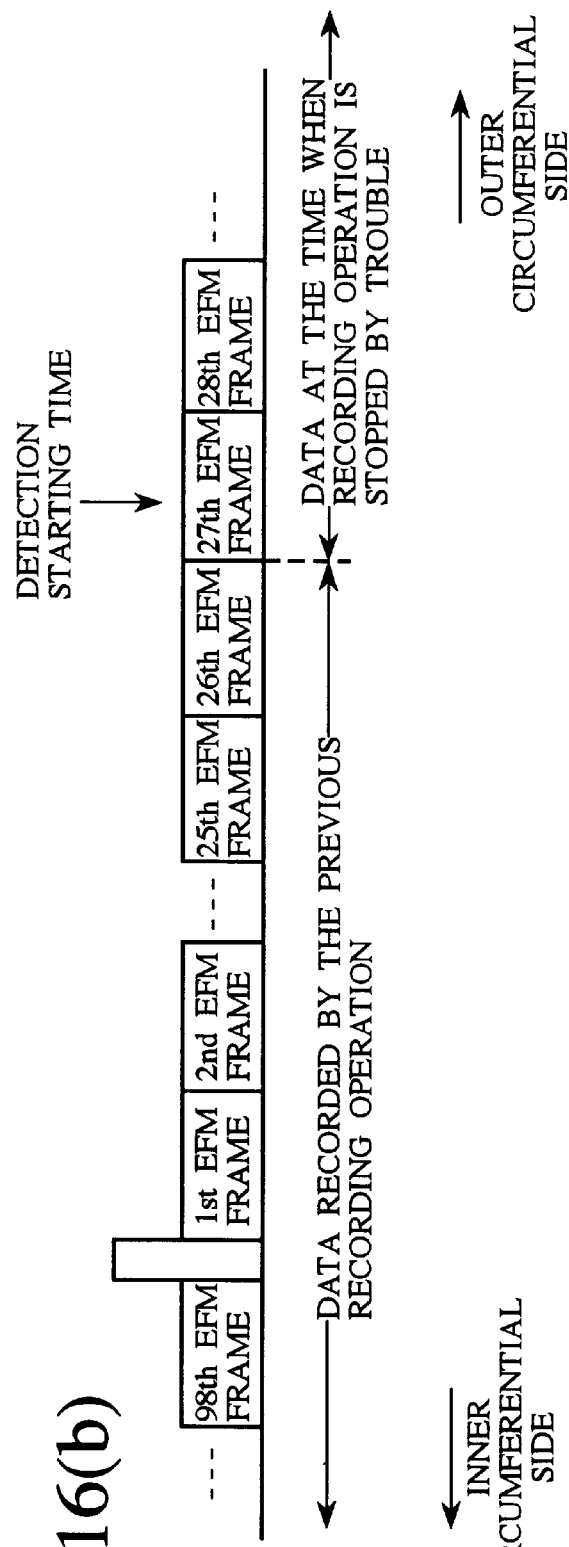

In the case where it is judged at Step S103 that no EFM data is recorded at the detection starting time, that is, in the case where EFM data is recorded until the 26th EFM frame as shown in FIG. 16(a), for example, or in the case where it is judged that EFM data is recorded at the detection ending time, this program is ended.

On the other hand, in the case where it is judged at Step S103 that EFM data is recorded at the detection starting time and that no EFM data is recorded at the detection ending time, that is, in the case where the end portion of EFM data lies between the detection starting time and the detection ending time, the number of tracks N in the radial direction from the position represented by the detection starting time toward the position represented by the detection ending time is counted (Step S104).

In this Step S104, the difference between the length in the radial direction from a predetermined point to the detection starting position and the length in the radial diction form the predetermined point to the detection ending time is obtained, and then the difference is divided by a pitch between adjacent tracks (that is, 1.6 $\mu$m).

Then, a judgement is made as to whether or not the optical pick-up 3 has moved to the position represented by the detection starting time at Step S105. In the case where it is judged at Step S105 that the optical pick-up 3 has moved to the position represented by the detection starting time, the number of tracks between the position represented by the detection starting time and the position represented by the detection ending time is divided by 10 to obtain the number of tracks S, that is S=N/10 (at Step S106).

Then, a track jump operation is carried out toward the outer circumferential direction for S tracks (Step S107). Namely, the optical pick-up 3 is moved toward the outer circumferential direction from the detection starting position for S tracks.

In more details, the CD servo controller 21 controls the operation of the actuator 4 to move the objective lens of the optical pick-up 3 to a target track and also controls the sled motor 5 so that the pick-up base of the optical pick-up 3 follows the movement of the objective lens. In this case, the CD servo controller 21 counts the number of tracks on which the objective lens of the optical pick-up 3 has passed using a counter (counting means) 211 based on the tracking error signal, and grasps the position of the objective lens of the optical pick-up 3 relative to the optical disc 2 based on the counted value. By controlling the operation (movement) of the objective lens in this way during the track jump operation, it becomes possible to move the optical pick-up 3 to the target track accurately.

Next, a judgement is made to examine as to whether EFM data is recorded or not (Step S108).

In the case where it is judged at Step S108 that EFM data is recorded, then a judgement is made as to whether or not the number of the track jump operations is 9 times (Step S109).

In the case where it is judged at Step S109 that the number of the track jump operations is equal to or less than 8 times, the program returns to Step S107, and then the processes after Step S107 are executed again.

On the other hand, in the case where it is judged at Step S109 that the number of track jump operations is 9 times, ATIP time information is obtained at that position (Step S110).

Then, the number of tracks N1 which lies between the position represented by the present time and the position represented by the detection ending time is calculated. Further, N1 is defined as N and the present time is set as a detection starting time (Step S111).

After Step S111, the program returns to Step S106, and then the processes after Step S106 are executed again.

On the other hand, in the case where it is judged at Step S108 that no EFM data is recorded, ATIP time information (A) is obtained at that position (Step S112).

Then, a track jump operation for S tracks is carried out toward the inner circumferential direction (Step S113). In other word, the optical pick-up 3 is moved from the position represented by the time information (A) toward the inner circumferential direction for S tracks. Then, ATIP information (B) is obtained at that position (Step S114).

Thereafter, the difference between the time (A) and the time (B) is calculated, the value of (A–B) is converted into the number of subcode frames F (the number of ATIP frames) (Step S115).

Next, a judgement is made as to whether or not F<150 at Step S116. In this connection, it is to be noted that the minimum number of subcode frames used when data is recorded into an optical disc 2 is normally 150. Therefore, in this embodiment, a judgement is made at Step S116 as to whether or not the number of remaining subcode frames F, that is the number of subcode frames which lies between the positions represented by the time A and the time B is less than 150. In this connection, it is to be noted that 150 subcode frames correspond to 2 seconds at the reference rotational speed (1×).

In the case where it is judged at Step S116 that F≧150, the number of tracks N2 which lies between the position represented by the present time (B) and the position represented by the time (A) which is the time when the track jump has been started. Further, N2 is defined as N, and the present time (B) is set as a detection starting time and the time (A) is set as a detection ending time (Step S117).

After Step S117, the program returns to Step S106, and then the processes after Step S106 are executed again.

Further, in the case where it is judged at Step S106 that F is less than 150 (F<150), a playing back mode (reproducing mode) is setup, and the end portion of EFM data is detected in one subcode frame (1 ATIP frame) by one subcode frame from the position represented by the time (B) for the subsequent F subcode frames, that is from the position represented by the time (B) to the position represented by the time (A) (Step S118).

In this Step S118, the PEEK signal and BOTTOM signal in the HF signal from the peek/bottom detecting circuit 17 shown in FIG. 10 are detected one subcode frame by one subcode frame from the position represented by the time (B), and then the levels of the PEEK signal and BOTTOM signal are compared with predetermined reference levels.

Then, a judgement is made as to whether EFM data is recorded or not for one subcode frame by one subcode frame from the position represented by the time (B) (at Step S119). In the case where it is judged that no EFM data is recorded, then ATIP time information (C) is obtained, and the data concerning the time (C) is stored in a predetermined address of the memory 26 (Step S120).

In this way, it is possible to detect the end portion of the EFM data with one subcode frame (ATIP frame) as a unit. As a result, it is possible to know that the end of the EFM data lies within the subcode frame (ATIP frame) for the position represented by the time (C), and then this program is ended.

Next, a routine for detecting an end portion of the recorded data with one EFM frame as a unit shown in FIG. 20 is executed. In this case, the detection of the end portion of the EFM frame is carried out for the subcode frame (ATIP frame) for the position represented by the time (C).

First, an initialization is carried out at Step S201. In this Step S201, a predetermined address of the memory 26 (an area to which the data concerning the number of EFM frames x described later is to be stored) is initialized, for instance.

Then, a detection mode for detecting an end portion of recorded data with one EFM frame as a unit shown in FIG. 20 is setup (Step S202).

Thereafter, the timer (timer function) 132 is initialized (Step S203).

Thereafter, the SUBCODE-SYNC signal from the SYNC signal generating/ATIP decoder 27 is made to be synchronized with the ATIP-SYNC signal from the SYNC signal generating/ATIP decoder 27 (Step S204).

Figure 21:
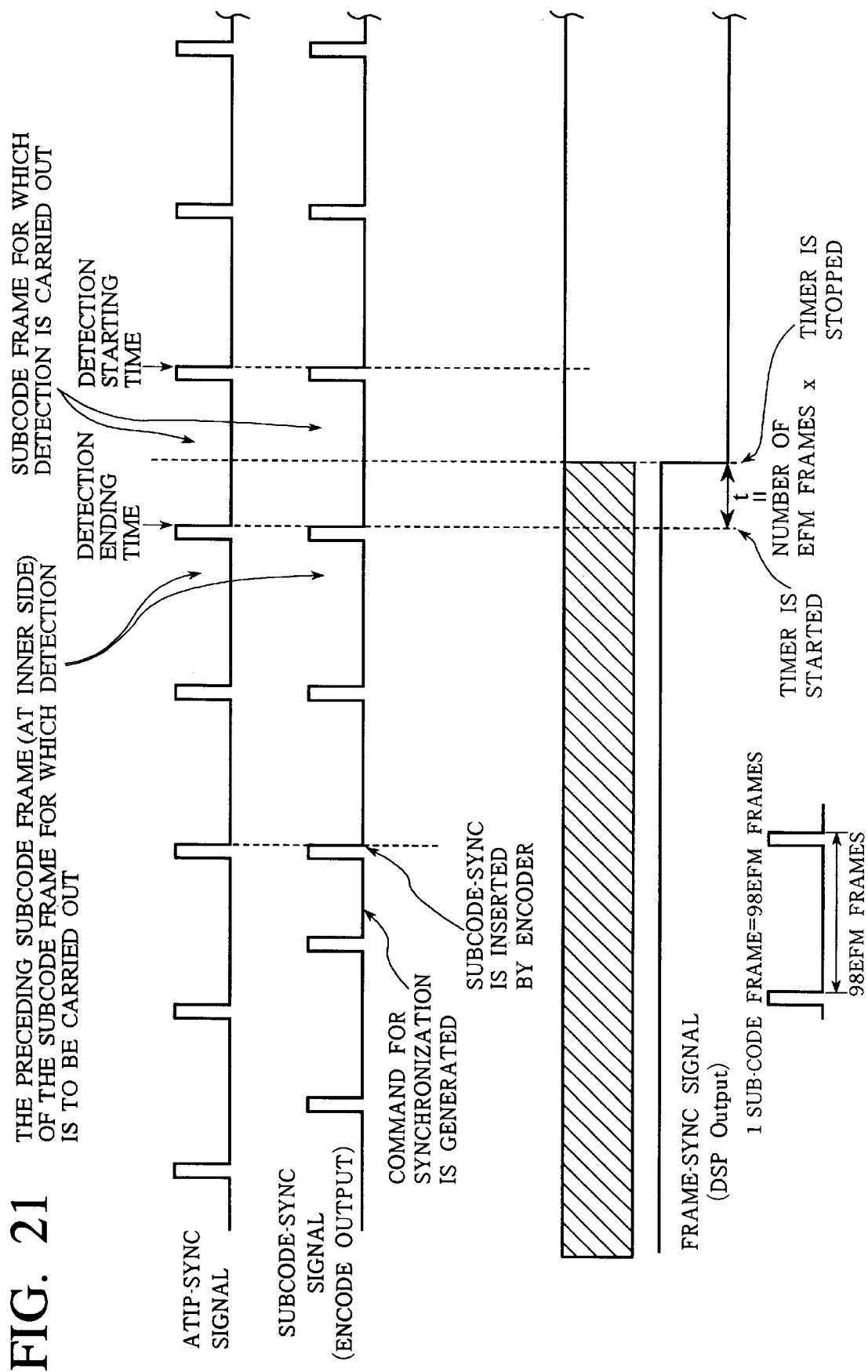
FIG. 21 is a timing chart which shows the relationship among the ATIP-SYNC signal, the SUBCODE-SYNC signal from the SYNC signal generating/ATIP decoder, the EFM signal and the FRAME SYNC signal.

In this Step S204, as shown in FIG. 21, a command for synchronization is generated. By receiving this command, the SUBCODE-SYNC signal comes to synchronization with the ATIP-SYNC signal, and thereafter the SUBCODE-SYNC signal is in synchronization with the ATIP-SYNC signal.

Next, the data concerning the time (C) is read out from the predetermined address of the memory 26 to specify the subcode frame for which detection of the end portion of the EFM data is to be carried out, and then the optical pick-up 3 moves to a subcode frame which is just precedent (in the inner side) to the specified subcode frame. Then, a judgement is made to confirm as to whether or not the optical pick-up 3 has moved to the subcode frame which is just precedent to the subcode frame for which the detection of the end portion of the EFM data is to be carried out (Step S205). In this Step S205, this judgement is made based on the ATIP time information.

When it is judged at Step S205 that the optical pick-up 3 has moved to the subcode frame which is just precedent to the subcode frame for which the detection of the end portion of the EFM data is to be carried out, a judgement is made as to whether or not the SUBCODE-SYNC signal from the SYNC signal generating/ATIP decoder 27 is detected (Step S206). In the case where it is judged that the SUBCODE-SYNC signal has been detected, the timer 132 is started (Step S207).

In this Step S207, the timer 132 is started at the trailing edge of the pulse. This timer 132 is constructed to produce one count per 2 μsec.

Next, a judgement is made as to whether the level of the FRAME SYNC signal is high (H) or not (Step S208).

As described above, in the case where the EFM signal is in synchronization with any one of the predetermined periods (3T–11T), that is, in the case where EFM data is recorded, the level of the FRAME SYNC signal becomes a high level (H). On the other hand, in the case where no EFM data is recorded, the level of the FRAME SYNC signal becomes a low level (L), as shown in FIG. 13 and FIG. 21. The level of the FRAME SYNC signal is switched in every one EFM frame.

In the case where it is judged at Step S208 that the level of the FRAME SYNC signal is a high level, then a judgement is made as to whether or not SUBCODE-SYNC signal from the SYNC signal generating/ATIP decoder 27 is detected (Step S209).

In the case where it is judged at Step S209 that no SUBCODE-SYNC signal is detected, the program returns to Step S208, and then the processes after Step S208 are executed again.

On the other hand, in the case where it is judged at Step S209 that SUBCODE-SYNC signal is detected, this means that the end portion of the EFM data is not included in the subcode frame. Therefore, this fact is written into a predetermined address of the memory 26.

Further, when it is judged at Step S298 that the level of the FRAME SINC signal is a low level (L), the timer 132 is stopped (Step S211).

Then, a time t is calculated based on the number of counts of the timer 132.

As described above, since the level of the FRAME SYNC signal is switched in every one EFM frame (one EFM frame is equal to 136 μsec at the reference rotational speed 1×) and the timer 132 produces one count per 2 μsec, the total count number of the timer 132 becomes an integral multiple of 68.

Next, the time t is converted into the number of EFM frames x (Step S213). In this way, it is possible to know that the end portion of EFM data is positioned at the x-th EFM frame in the subcode frame at the position represented by the time C.

Then, the data concerning the x-th EFM frame is stored in a predetermined address of the memory 26 (Step S214).

This program is ended after Step S214 or Step S210.

The data concerning the x-th EFM frame will be utilized when the recorded data is to be repaired (an automatic repair is to be carried out) or the like.

When the recorded data is to be repaired, data is recorded onto the optical disc 2 such that no gap (a portion in which no data is recorded) is formed between the x-th EFM frame and the adjacent EFM frame and such that the data is overwritten up to 12 EFM frames at the maximum as well as the end of the EFM data is positioned at the 26th EFM frame (see FIG. 16(a)). By carrying out this repairing process, it becomes possible to record the remaining non-recorded data into the optical disc 2.

As described above, according to the method of detecting an end portion of recorded data of this invention, it is possible to detect the end of the recorded data with one EFM frame as a unit.

Therefore, even when the recording operation is stopped (that is, when the recording operation is failed), the end portion of the recorded data can be detected with one EFM frame as a unit. With this result, repair of the recording data can be carried out easily, and therefore the remaining non-recorded data can be recorded into the optical disc 2 reliably.

In this connection, it is to be noted that ATAPI (SFF8080) and SCSI (MMC) require that optical disc drives are equipped with a repair function (automatic repairing function). According to the optical disc drive of the present invention, it is possible to equip with such a repair function easily since the end portion of the recorded data can be detected with one EFM frame as a unit.

Further, according to the optical disc drive 1 of the present invention, the optical pick-up 3 is moved to the target track by track jump operations without reading acquiring the ATIP time information. Therefore, a waiting time required for establishing synchronization for reading the ATIP time information becomes unnecessary. Further, since the end portion of the recorded data is detected by dividing the number of tracks which lies between the detection starting time and the detection ending time into ten units, it is possible to detect the end of the recorded data in a short time.

Further, in the conventional optical disc drive in which it takes a relatively long time to detect an end portion of recorded data, there is such a problem as follows. Namely, the currently used operation system of a computer 41 has a function that stops and resets accessing operation to an external device when it takes a relatively long time until receiving a response from the external device. Therefore, in the conventional optical disc drive, there is a case that access from the computer is reset even when a command for detecting an end portion of recorded data has been received from the computer. However, according to the optical disc drive of the present invention, it is possible to send a response to the computer soon when a command for detecting an end portion of recorded data is received from the computer 41, thereby enabling to settle the problem involved in the conventional optical disc drive.

The optical disc drive according to the present invention is not limited to a CD-R drive as described above. The present invention can be applied to other various disc drives which can record and playback optical discs having a pre-groove such as CD-RW, DVD-R, DVD-RAM and the like.

Further, the present invention can be applied to the case where an end portion of recorded data is to be detected when recording operation is stopped or interrupted due to trouble during the recording operation of data to PMA of an optical disc.

Furthermore, the present invention can be also applied to the case where an end portion of recorded data which is written in a packet maltiplex mode is to be detected.

Although in the foregoing the description was made with regard to the embodiments of the optical disc drive and the method of detecting the end portion of the recorded data according to the present invention, the present invention is not limited to these embodiments, and it goes without saying that the structure of each component or element can be replaced with other structure having the same function.

For example, in the present invention, the optical disc drive can be constructed such that a detection starting time (detection starting position) for detecting an end portion of recorded data is started from a fist recordable EFM frame in a non-recorded (unused) optical disc, that is the innermost recordable EFM frame.

Finally, it should be also noted that even though the optical disc drive of the present invention was described with reference to the embodiments shown in the drawings, the present invention is not limited thereto, and any additions or changes may be made without departing from the scope of the following claims.

What is claimed is:

1. An optical disc drive for recording and playing back an optical disc having a plurality of tracks, comprising:

an optical disc driving mechanism for rotating an optical disc;

an optical pick-up for recording and playing back data to and from the optical disc;

signal processing means at least for processing signals read out from the optical disc through the optical pick-up; and control means for controlling at least the optical disc driving mechanism, the optical pick-up and the signal processing means, and means for detecting an end portion of recorded data in the optical disc, wherein a detection starting position and a detection ending position are set in the optical disc and the number of tracks between the detection starting position and the detection ending position is divided into more than three divided portions defined by dividing points, in which the detecting means detects presence or absence of the recorded data in each of the dividing points by moving the optical pick-up from the detecting starting point and then determines that the end portion of the recorded data lies in a divided portion specified between the dividing point at which presence of the data is detected and the adjacent other dividing point at which absence of the data is detected.

2. The optical disc drive as claimed in claim 1, wherein the optical pick-up is moved in a stepwise manner without acquiring time information from the optical disc.

3. The optical disc drive as claimed in claim 2, wherein the optical pick-up is moved from one dividing point to adjacent dividing point by means of a track jump operation without acquiring the time information from the optical disc on or before the absence of the data is detected.

4. The optical disc drive as claimed in claim 1, wherein the detecting means is constructed to repeatedly continue the detection of the presence or absence of the recorded data for thus obtained specified divided portion until the interval of a subsequently obtained divided portion becomes less than a predetermined value, in which the dividing point at which the presence of the data is detected is set to be one of a detection starting position and a detection ending position and the adjacent other dividing point is set to be the other position, and in the subsequent process vice versa.

5. The optical disc drive as claimed in claim 4, wherein the detecting means is constructed to detect the presence and absence of the data continuously in the specified divided portion after the interval of the specified divided portion has become smaller than the predetermined value, thereby specifying the end portion of the recorded data.

6. The optical disc drive as claimed in claim 1, further comprising means for counting the number of tracks on which the optical pick-up has passed, in which the detecting means is constructed to move the optical pick-up to the target track while grasping the position of the optical pick-up relative to the optical disc based on the counted value of the counting means.

7. The optical disc drive as claimed in claim 1, wherein the number of the divided portions is 8 to 10.

8. A method of detecting an end portion of recorded data recorded in an optical disc loaded in an optical disc drive, comprising the steps of:

(a) setting a detection starting position and a detection ending position on the optical disc;

(b) dividing the number of tracks between the detection starting position and the detection ending position into more than three divided portions defined by dividing points;

(c) detecting presence or absence of the recorded data at each of the dividing points sequentially from the detection starting point; and (d) determining that the end portion of the recorded data lies in a divided portion specified between the dividing point at which presence of the data is detected and the adjacent other dividing point at which absence of the data is detected.

9. The method as claimed in claim 8, wherein the optical disc drive is equipped with an optical pick-up for recording and playing back data, in which the detection of the presence or absence of the recorded data is carried out by moving the optical pick-up in a stepwise manner.

10. The method as claimed in claim 8, wherein the steps (a) to (d) are repeatedly carried out for the specified divided portion and then a subsequently obtained divided portion until the interval of the divided portion becomes less than a predetermined value.

11. The method as claimed in claim 10, the method further comprising the step of detecting the presence and absence of the data continuously in the specified divided portion after the interval of the specified divided portion has become smaller than the predetermined value, thereby specifying the end portion of the recorded data.

12. The method as claimed in claim 8, wherein the number of the divided portions is 8 to 10.

* * * * *

UNITED STATES PATENT AND TRADEMARK OFFICE
CERTIFICATE OF CORRECTION

PATENT NO. : 6,266,308 B1
DATED : July 24, 2001
INVENTOR(S) : Andoh

It is certified that error appears in the above-identified patent and that said Letters Patent is hereby corrected as shown below:

Column 2,
Line 2, change "to adjacent" to read -- to an adjacent --

Column 3,
Line 46, change "peek/bottom" to read -- peak/bottom --

Column 4,
Line 5, change "FIG." to read -- FIGS. --
Line 64, change "of sine" to read -- of a sine --

Column 5,
Line 60, change "An separate" to read -- A separate --

Column 6,
Line 24, change "order in this order" to read -- order --.

Column 14,
Line 3, change "pulse/minus" to read -- plus/minus --

Column 16,
Line 34, change "tack" to read -- track --

Column 19,
Line 40, change "word" to read -- words --

Column 22,
Line 54, change "maltiplex" to read -- multiplex --

Signed and Sealed this

Twenty-seventh Day of November, 2001

Attest:

NICHOLAS P. GODICI
Attesting Officer  Acting Director of the United States Patent and Trademark Office